Figure 1:
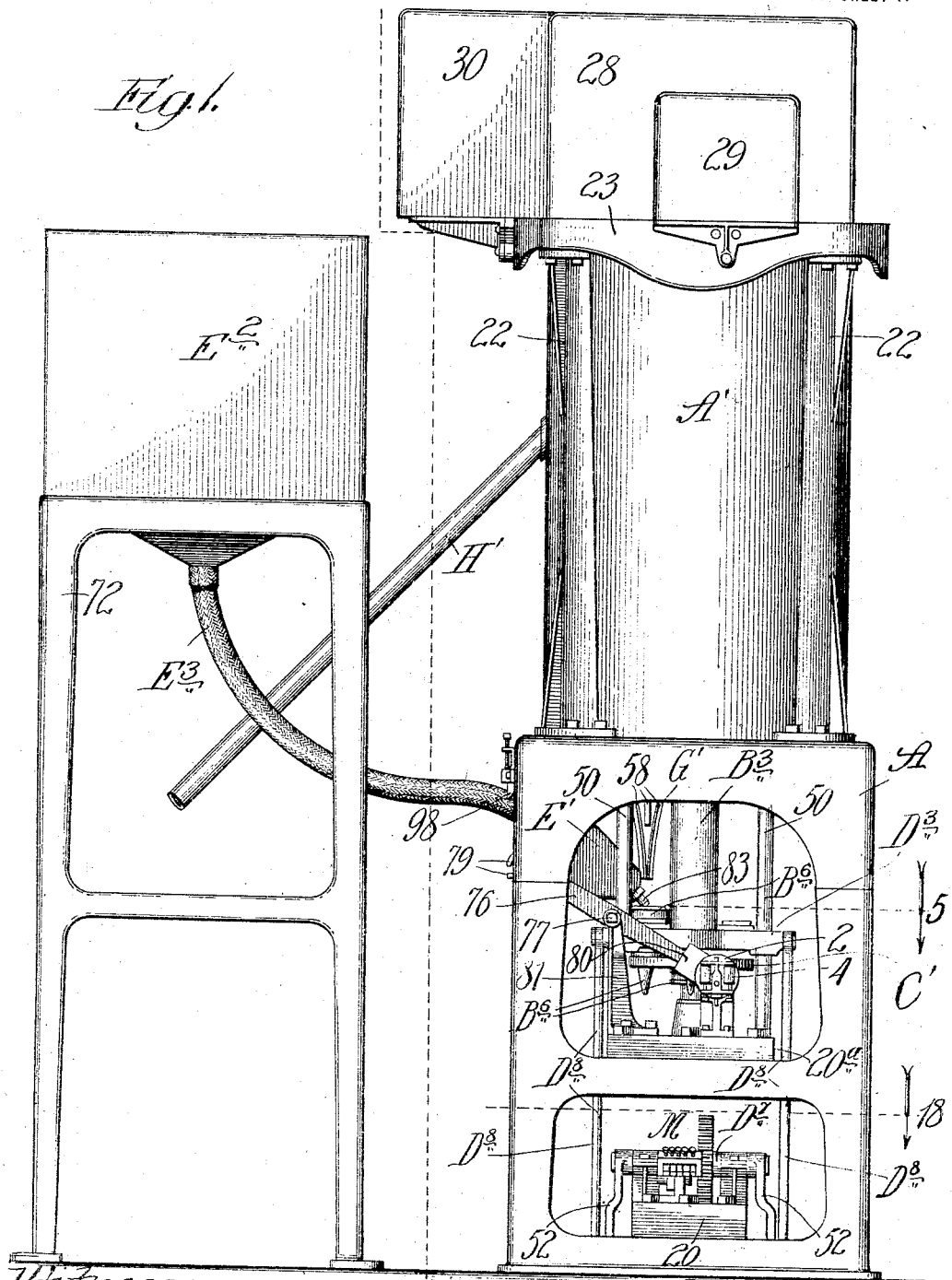

H. V. BOZELL & H. B. DWIGHT.
MOLDING AND BAKING MACHINE.
APPLICATION FILED MAR. 26, 1913.

1,160,368.

Patented Nov. 16, 1915.
20 SHEETS—SHEET 1.

Witnesses

Inventors:
Harold Veatch Bozell
Herbert Bancroft Dwight
By Dyrenforth, Lee, Chritton and Wiles
Attys

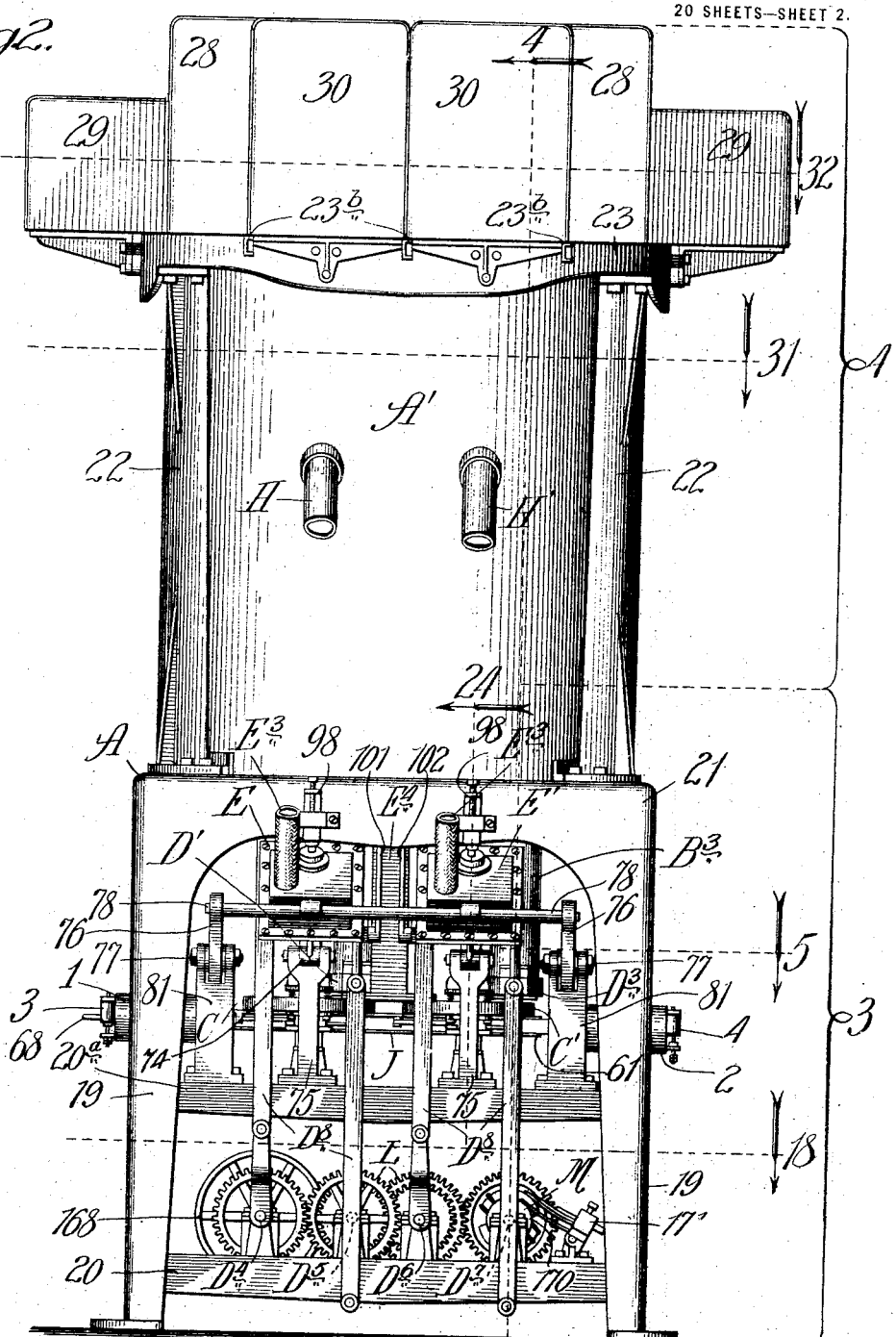

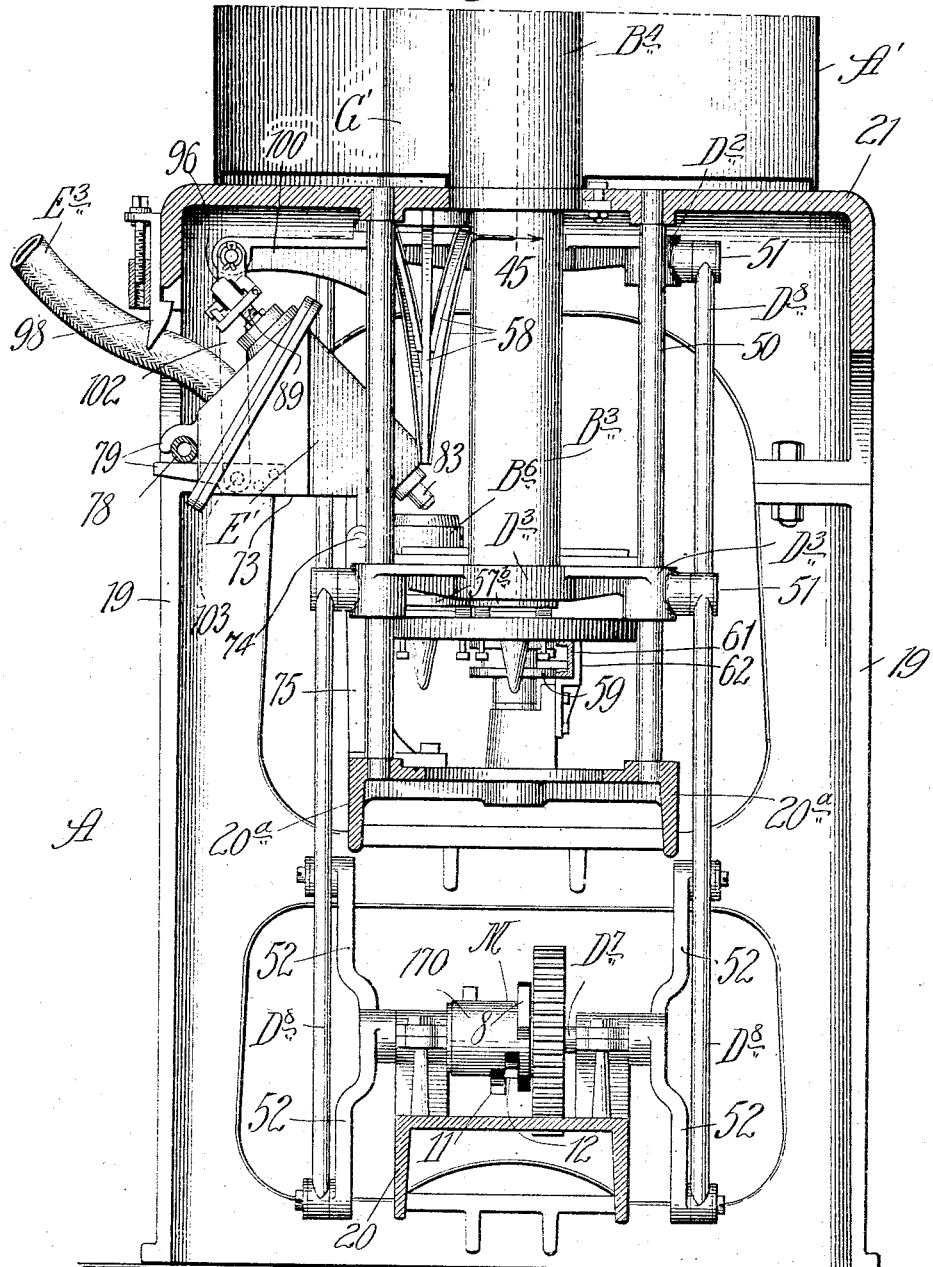

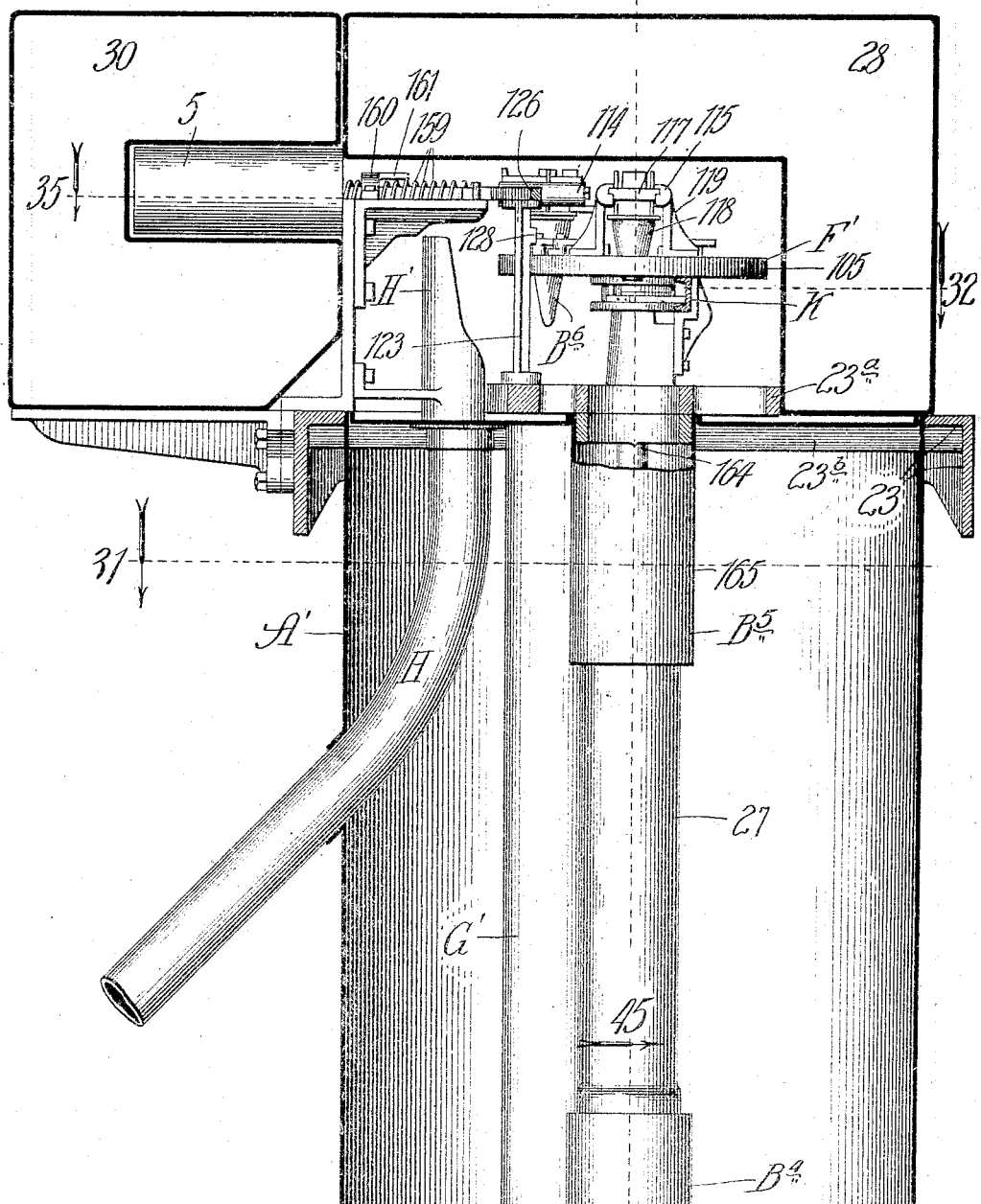

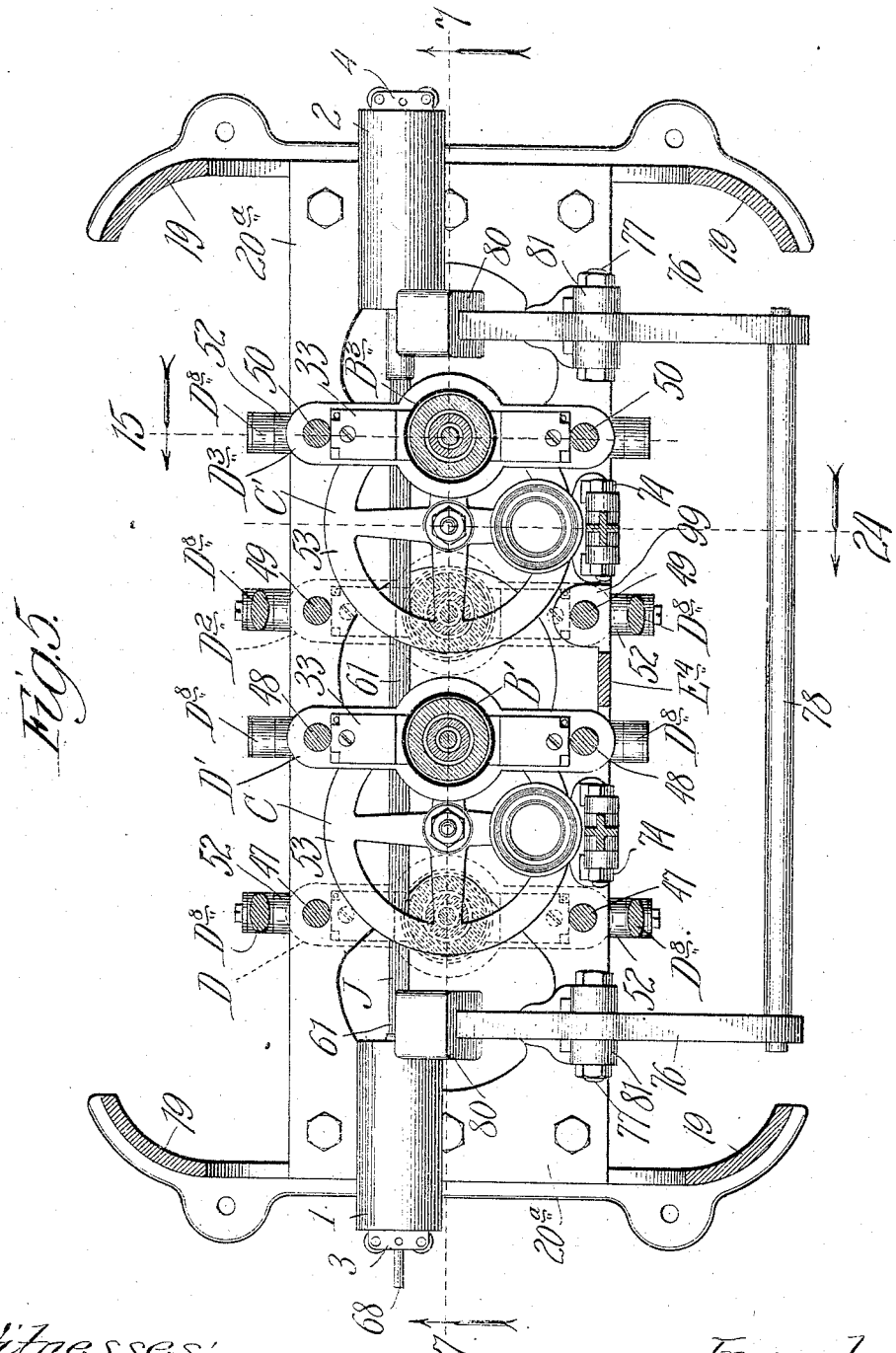

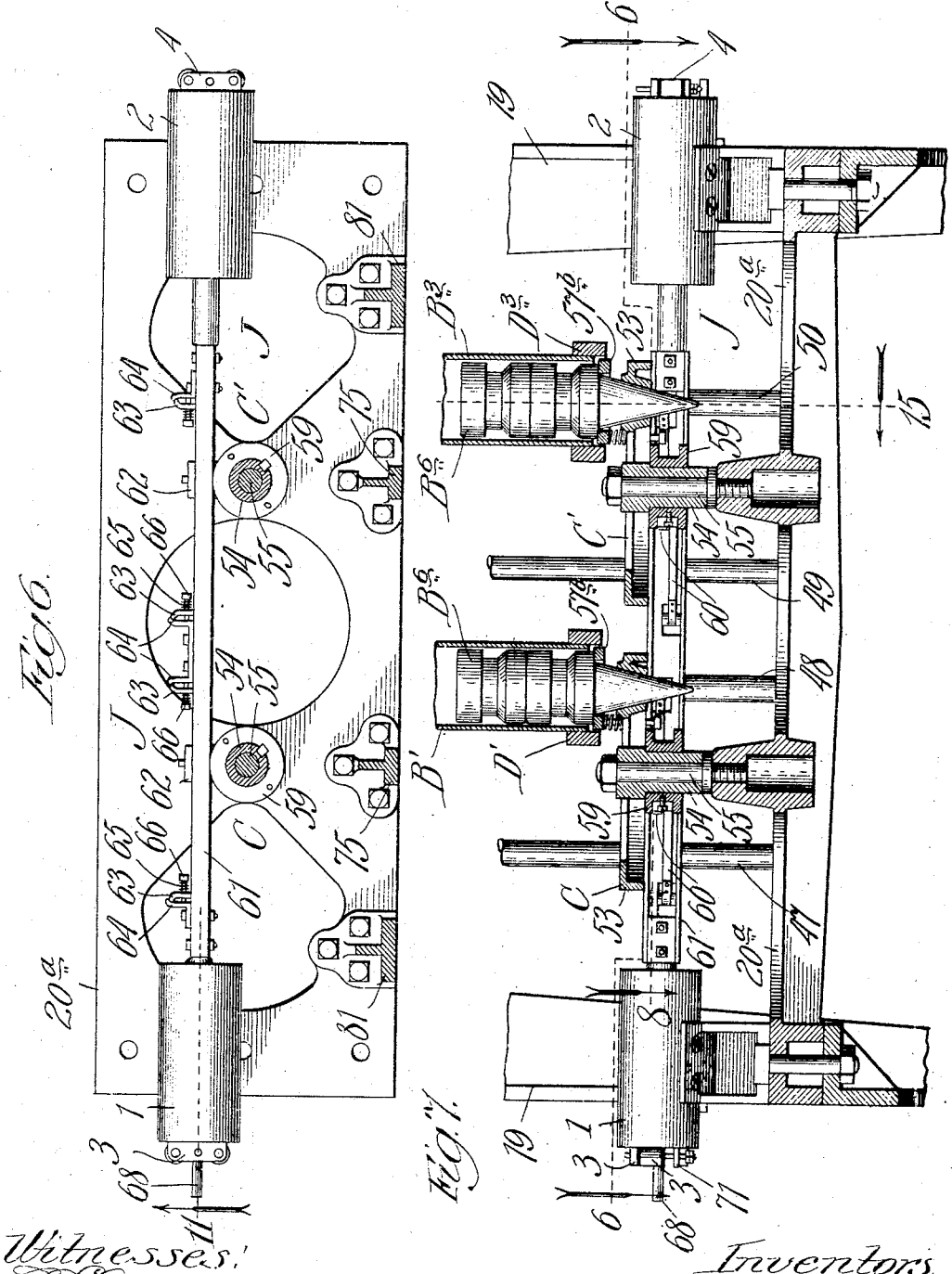

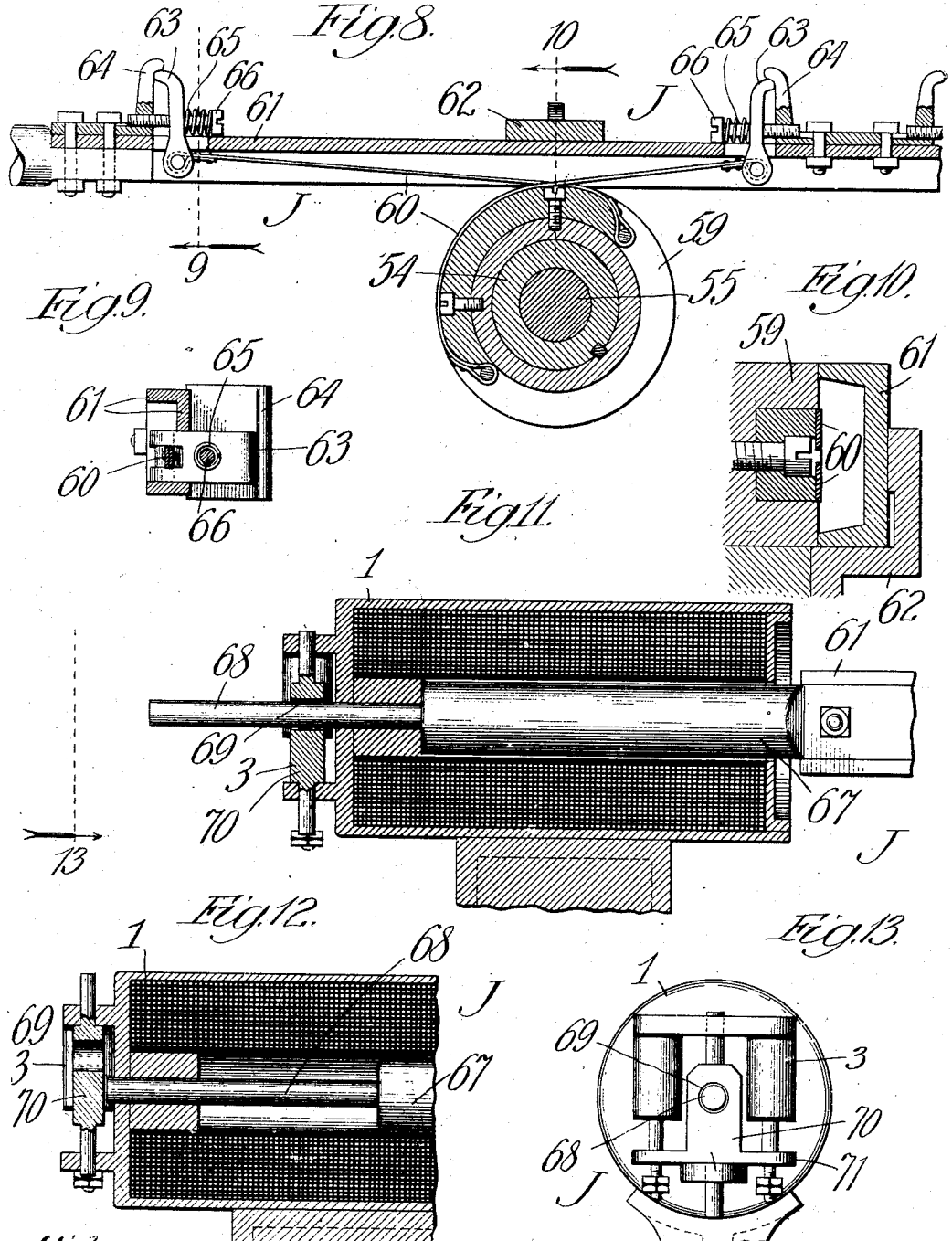

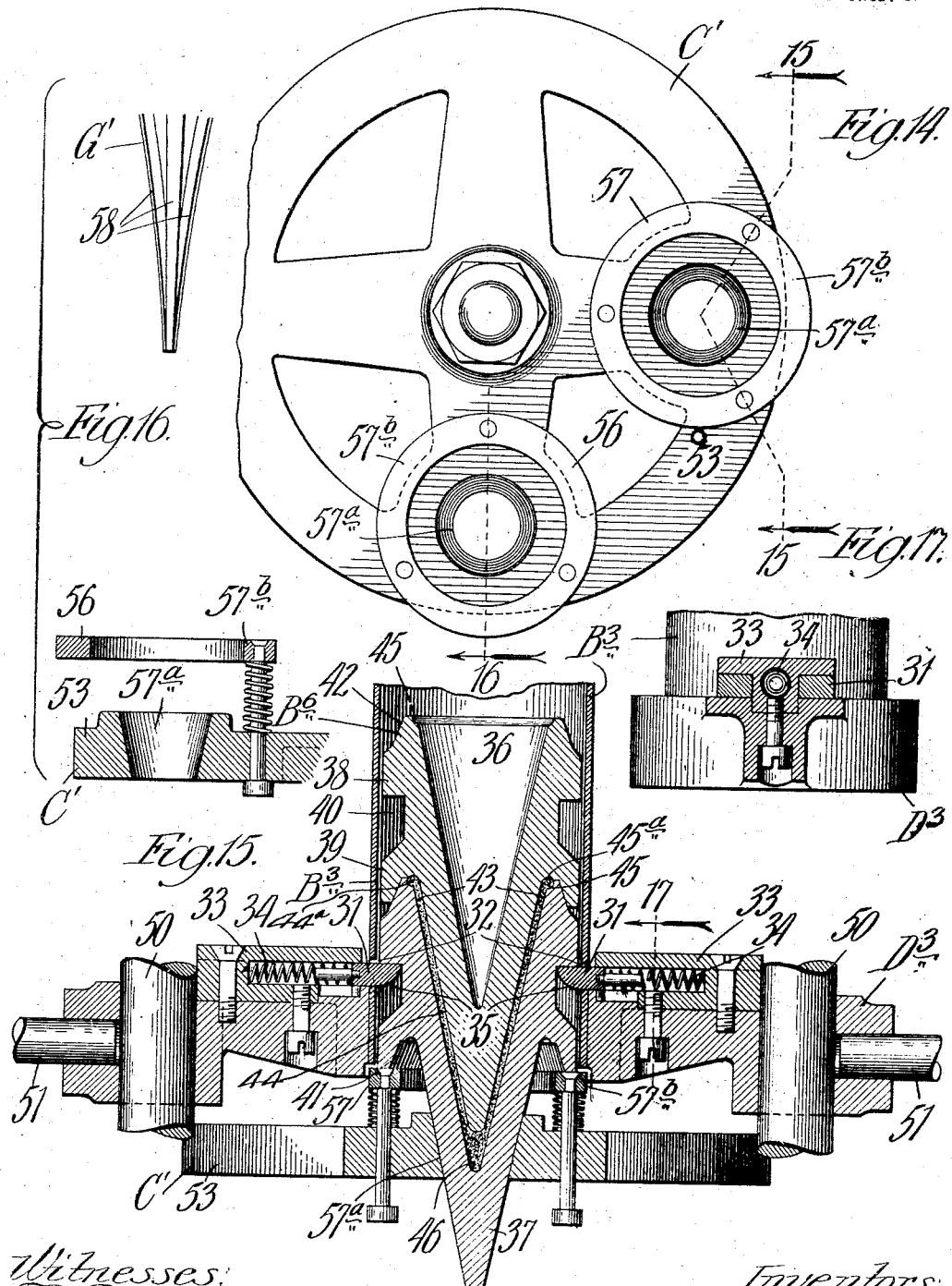

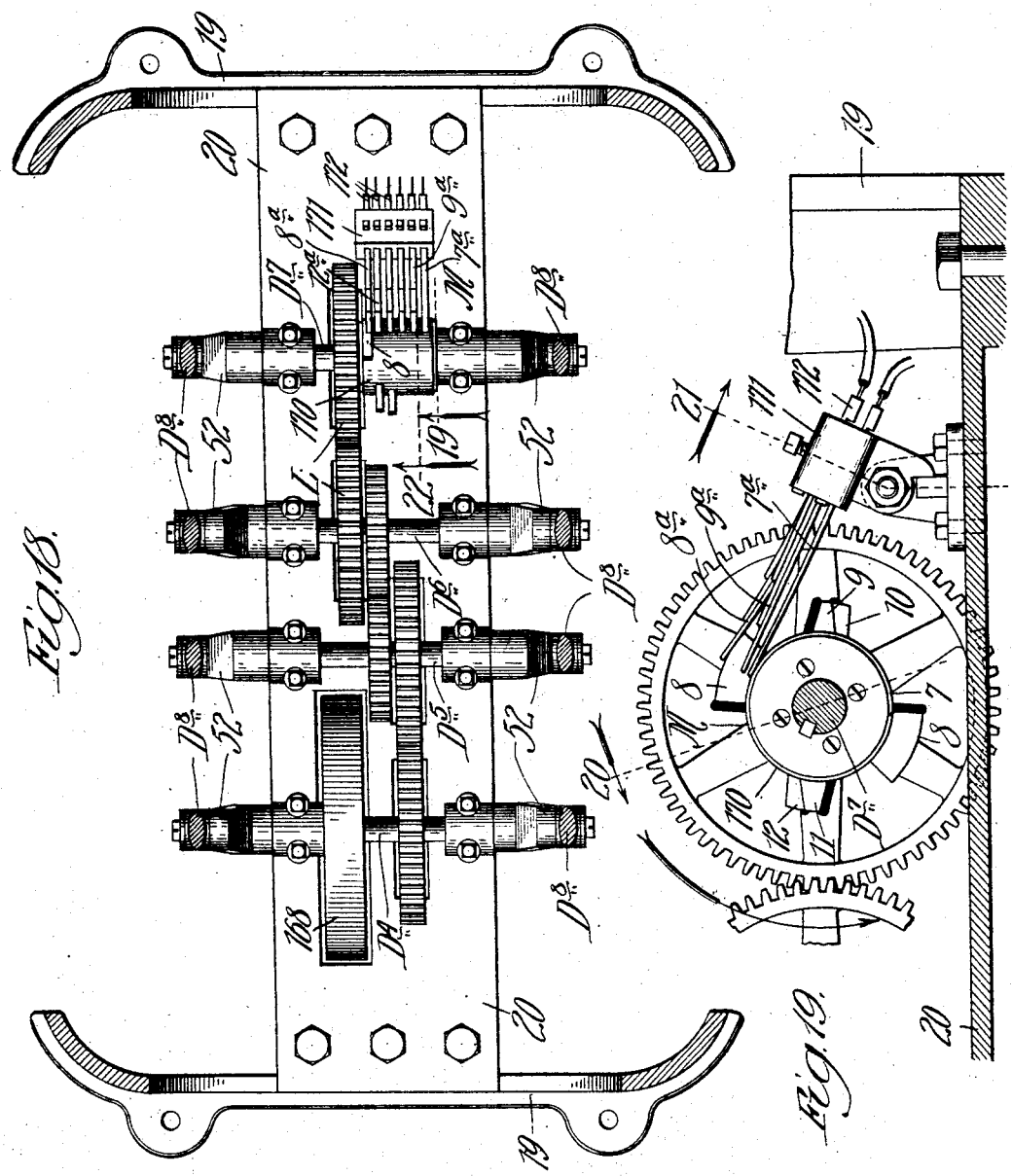

H. V. BOZELL & H. B. DWIGHT.
MOLDING AND BAKING MACHINE.
APPLICATION FILED MAR. 26, 1913.
1,160,368.
Patented Nov. 16, 1915.
20 SHEETS—SHEET 10.
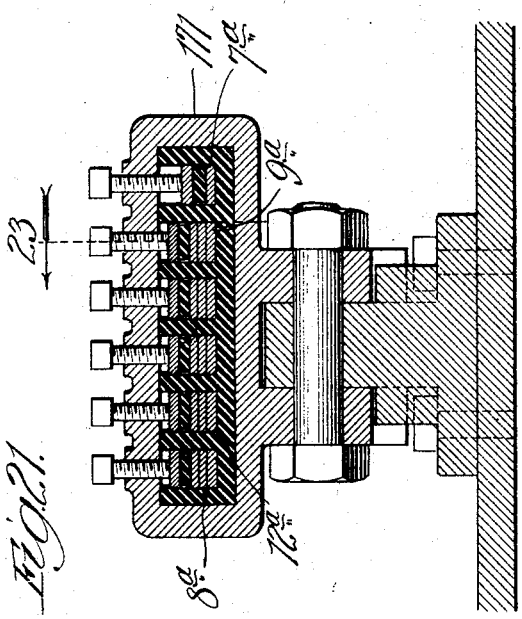
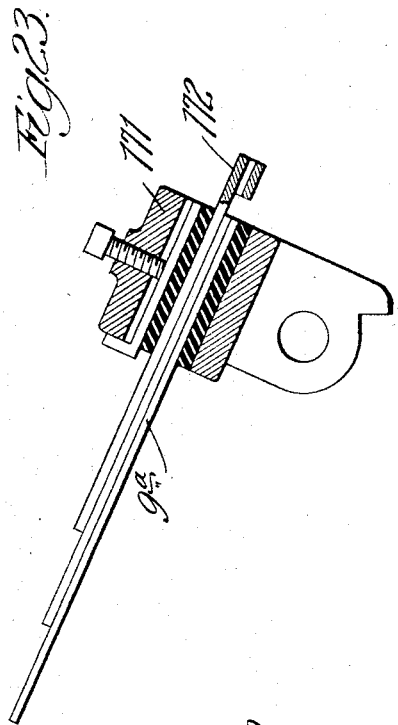
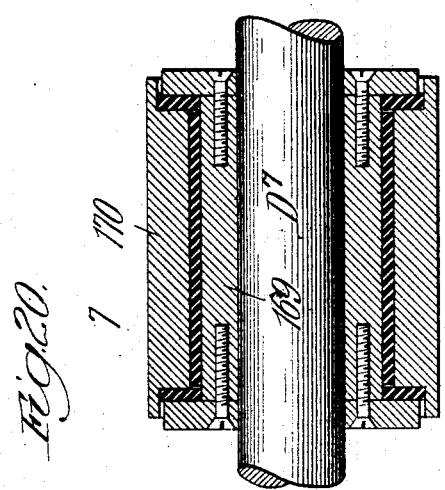
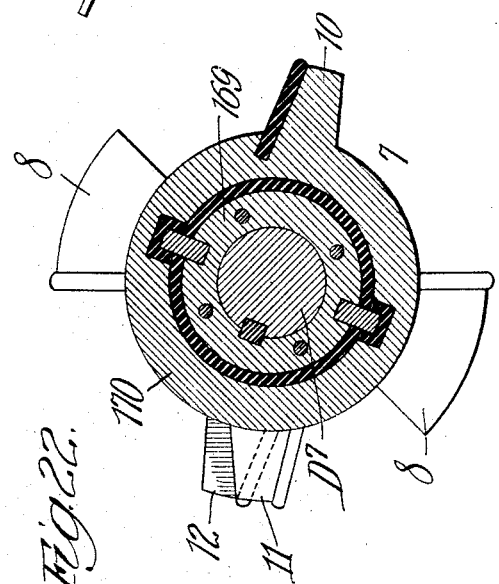

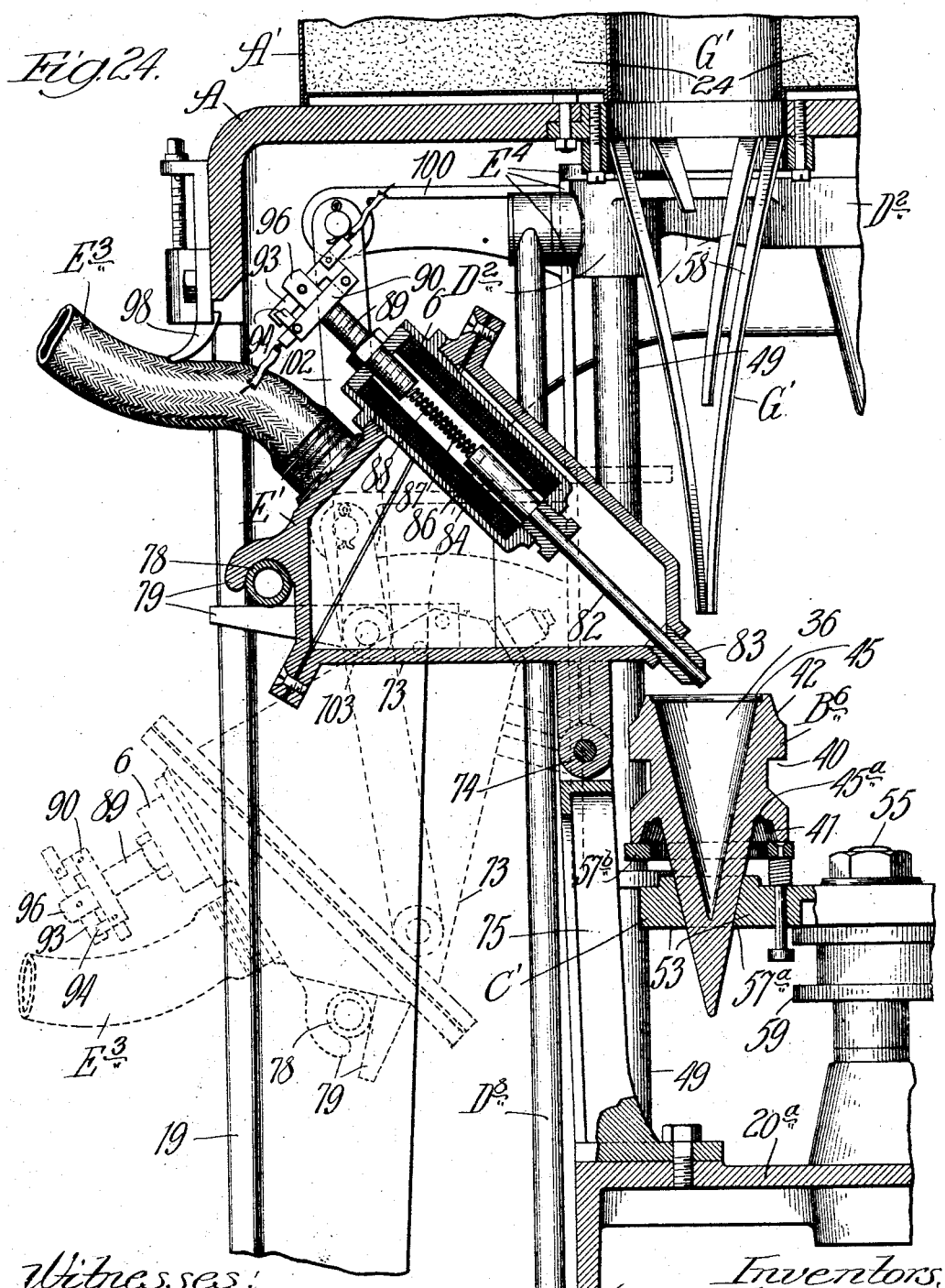

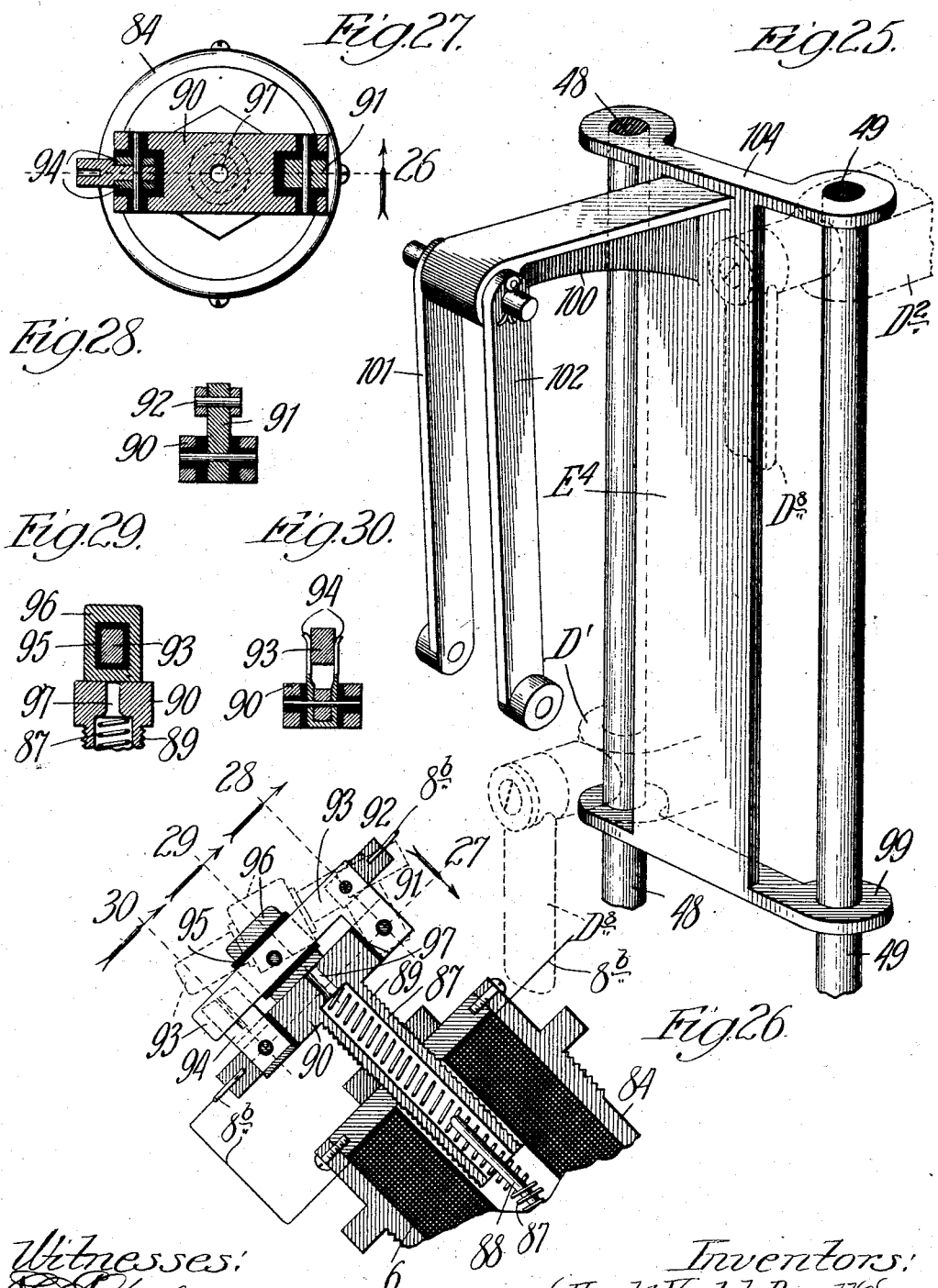

H. V. BOZELL & H. B. DWIGHT.
MOLDING AND BAKING MACHINE.
APPLICATION FILED MAR. 26, 1913.
1,160,368.
Patented Nov. 16, 1915.
20 SHEETS—SHEET 13.
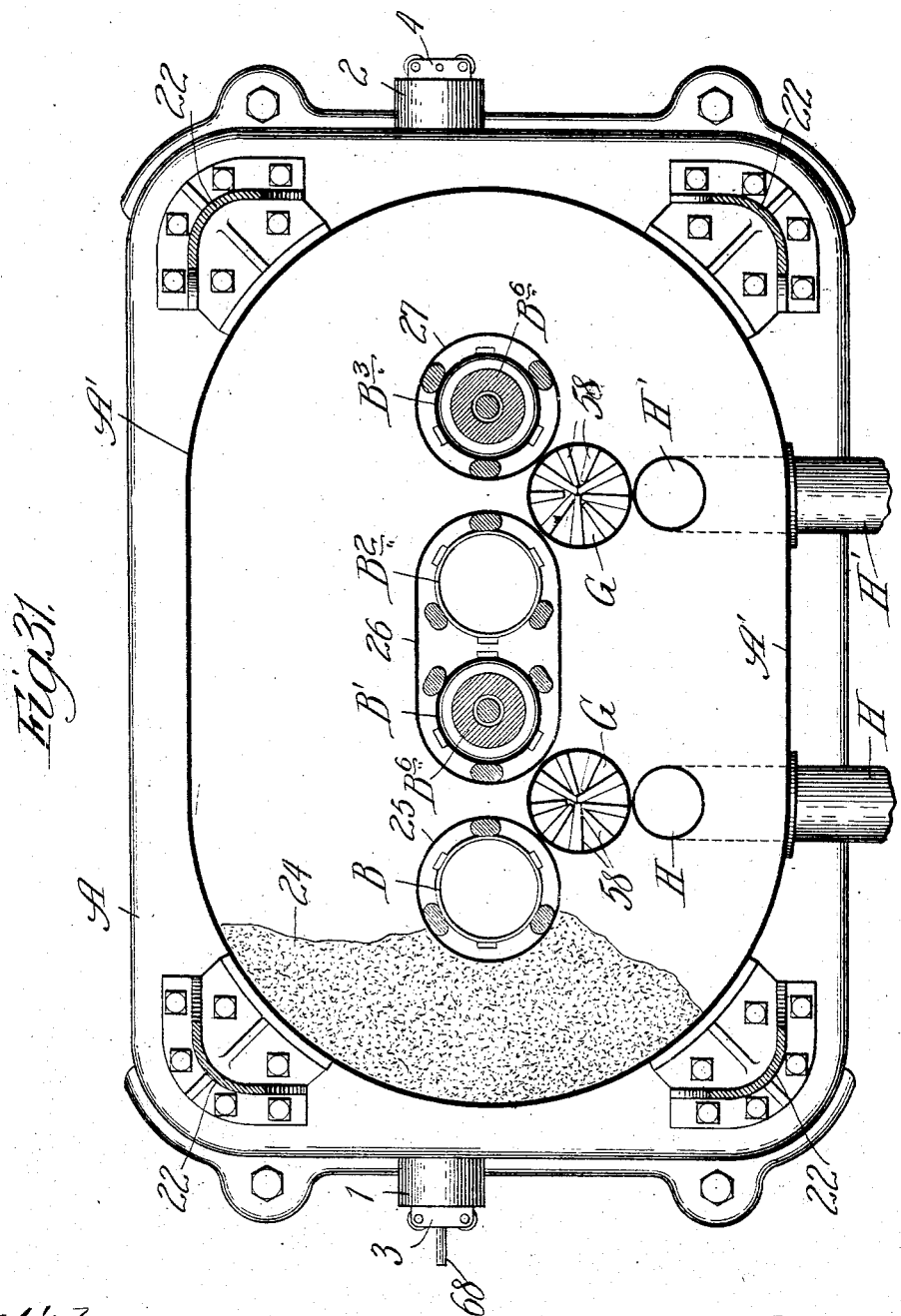
Witnesses:
Inventors:
Harold Veatch Bozell,
Herbert Bancroft Dwight,
By Dyrenforth, Lee, Chritton & Wiles,
Attys

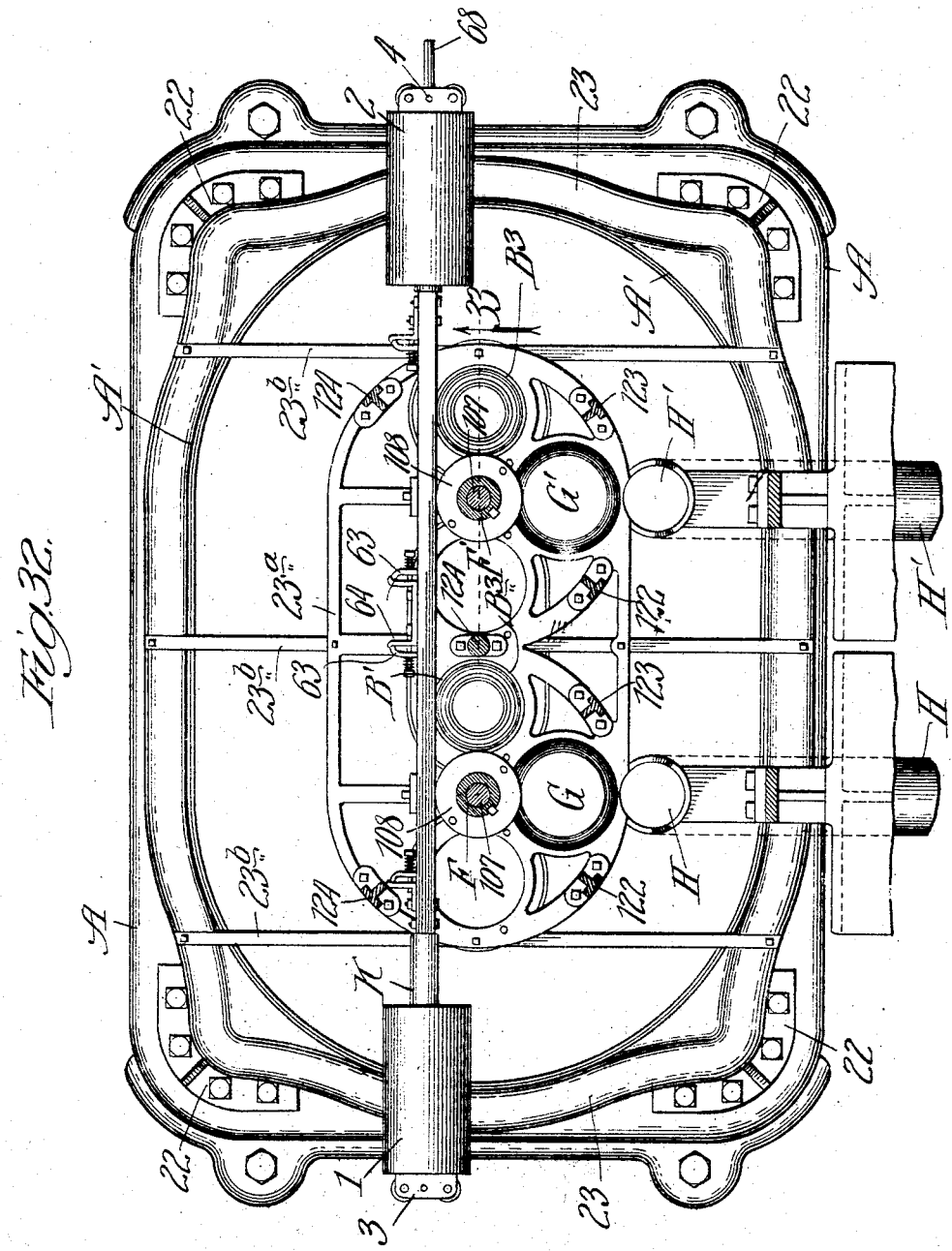

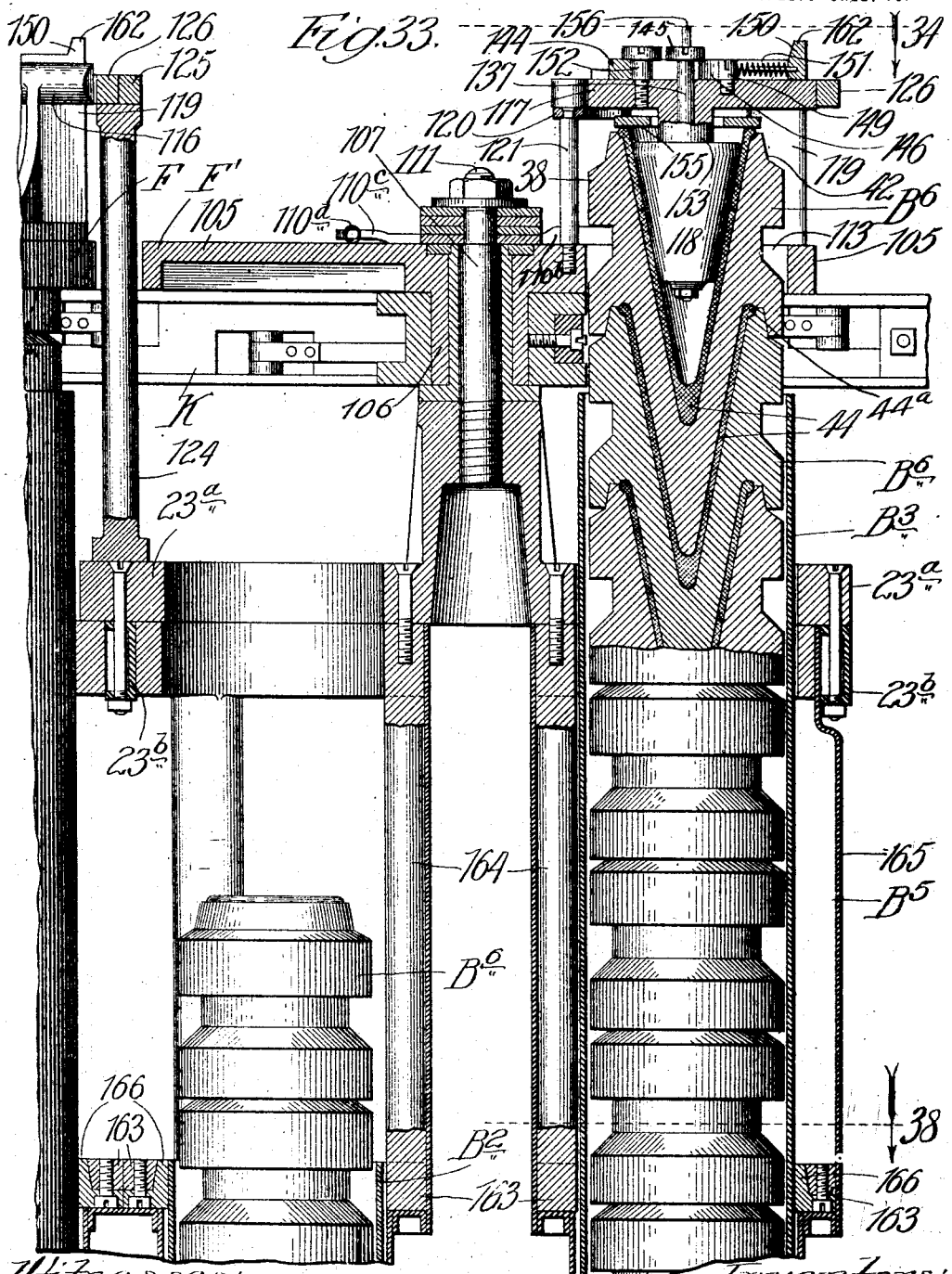

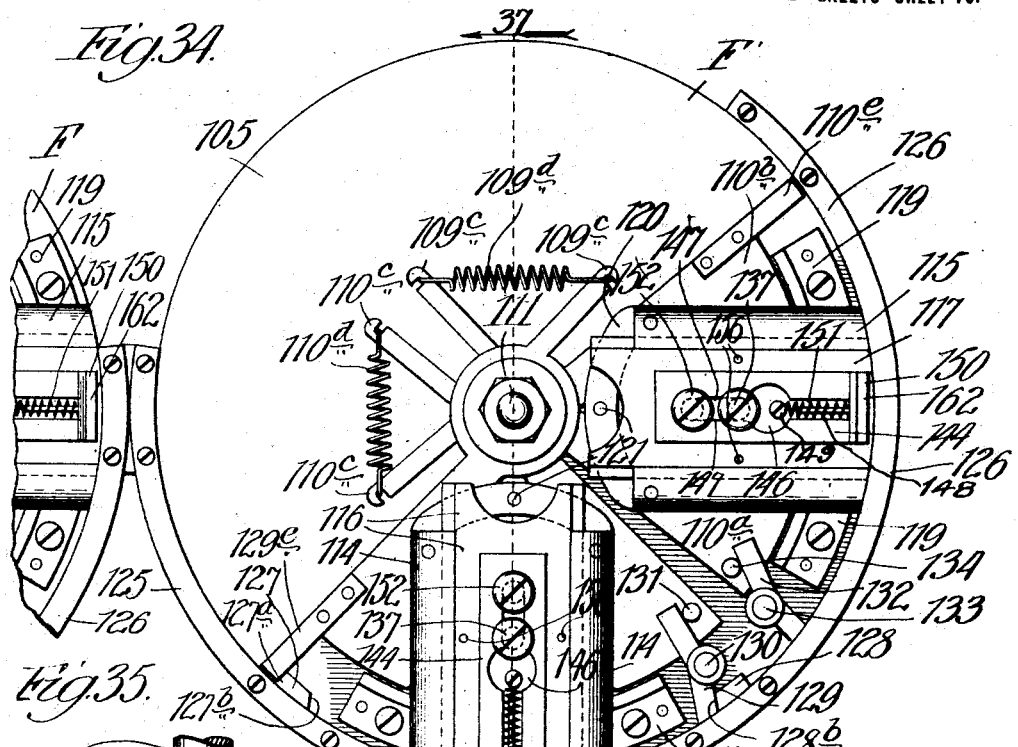

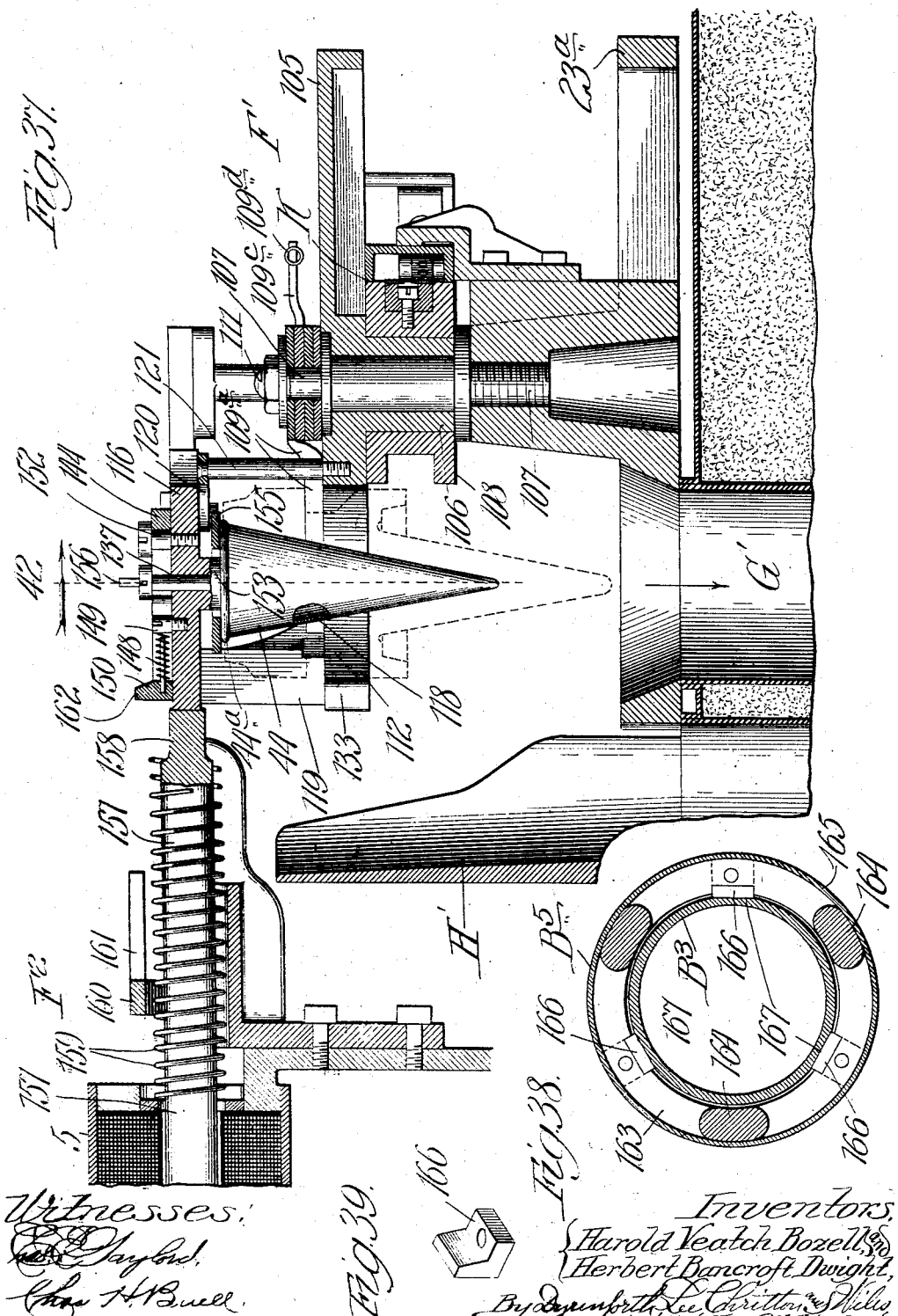

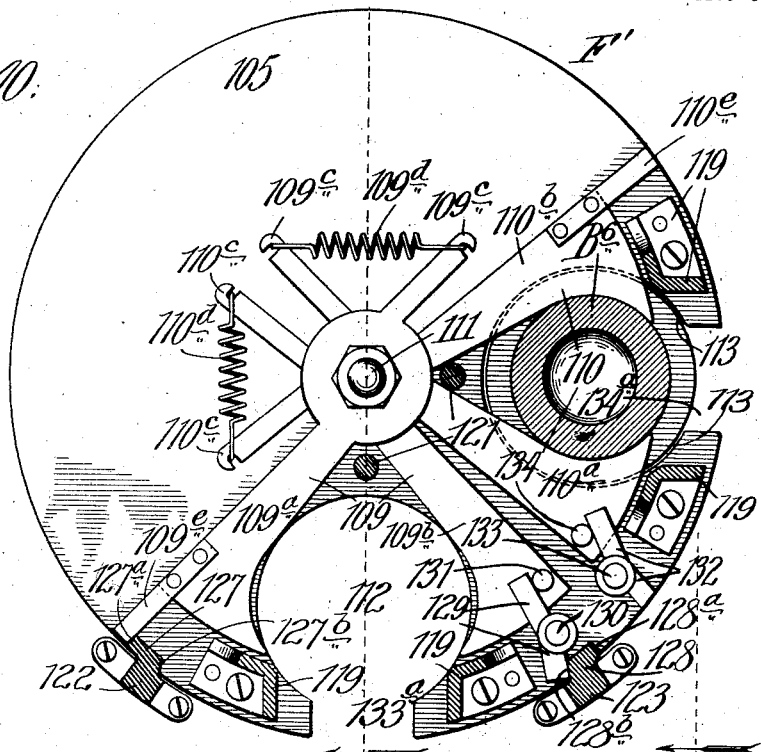
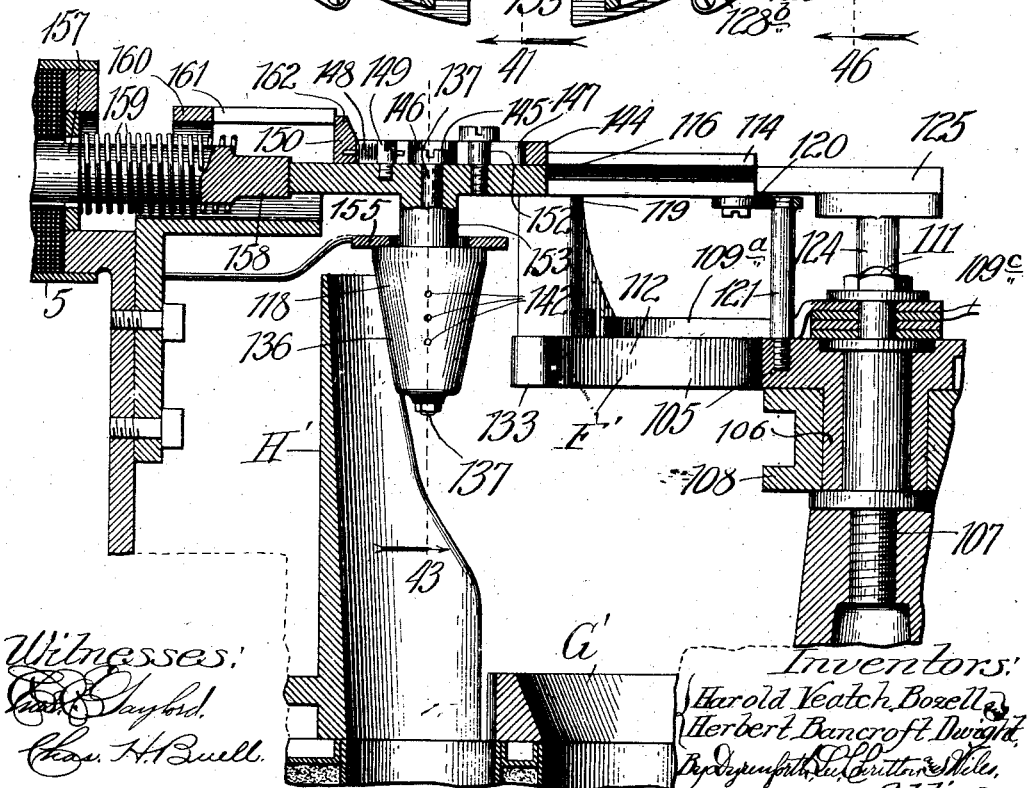

H. V. BOZELL & H. B. DWIGHT.
MOLDING AND BAKING MACHINE.
APPLICATION FILED MAR. 26, 1913.
1,160,368.
Patented Nov. 16, 1915.
20 SHEETS—SHEET 19.
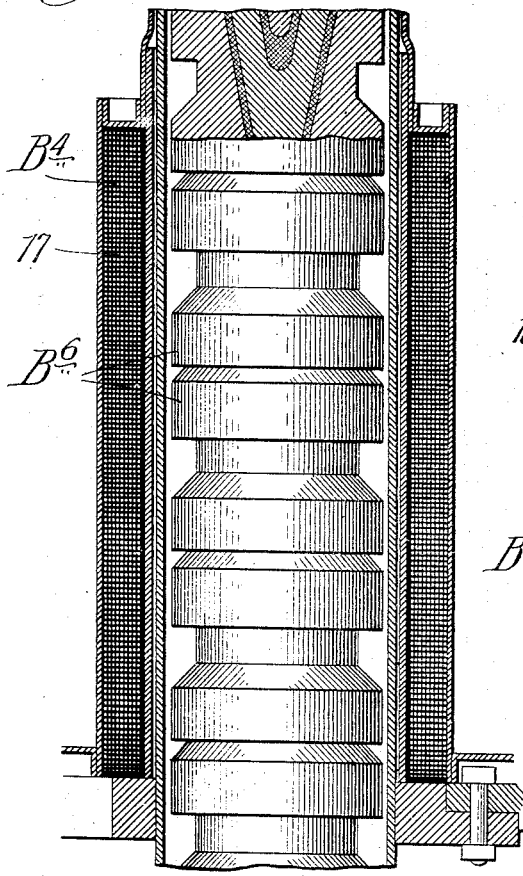
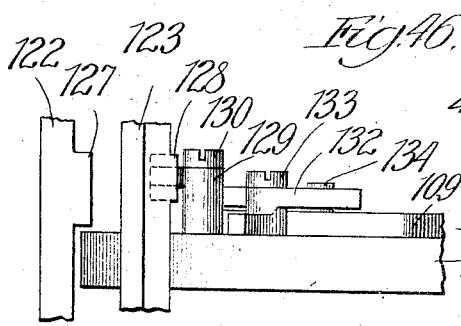
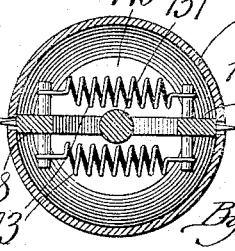
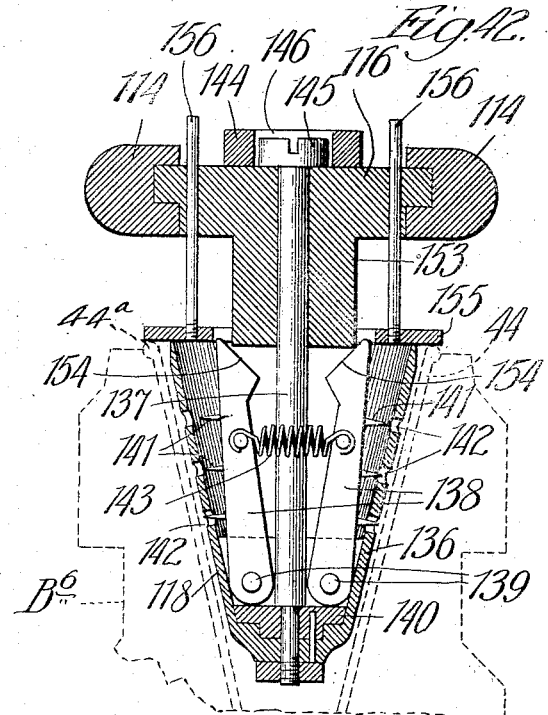
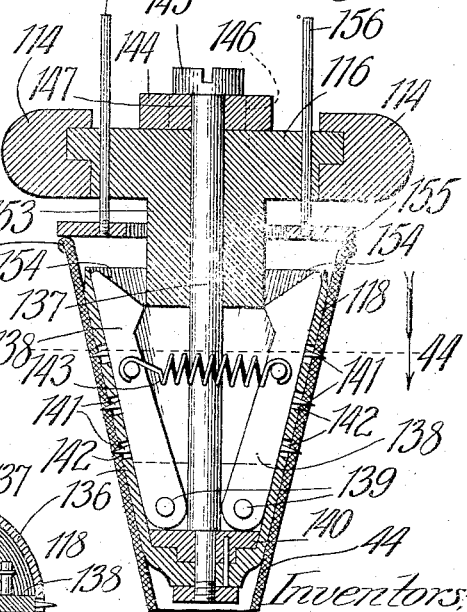

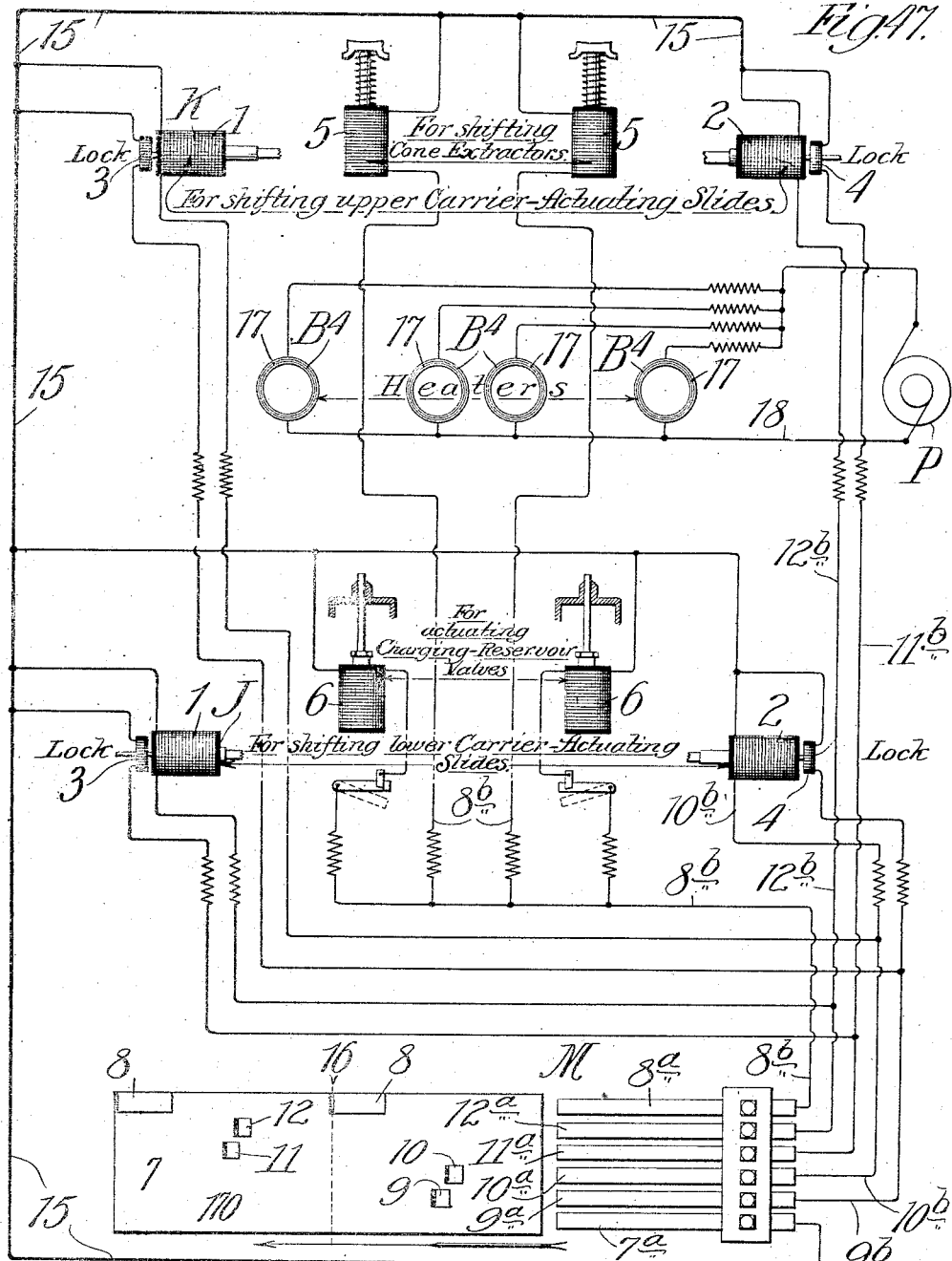

UNITED STATES PATENT OFFICE.

HAROLD VEATCH BOZELL AND HERBERT BANCROFT DWIGHT, OF NORMAN, OKLAHOMA.

MOLDING AND BAKING MACHINE.

1,160,368. Specification of Letters Patent. Patented Nov. 16, 1915.

Application filed March 26, 1913. Serial No. 756,904.

*To all whom it may concern:*

Be it known that we, HAROLD VEATCH BOZELL and HERBERT BANCROFT DWIGHT, citizens of the United States, residing at Norman, in the county of Cleveland and State of Oklahoma, have invented new and useful Improvements in Molding and Baking Machines, of which the following is a specification.

This invention relates particularly to machines for use in molding and baking pastry cups or cones. The improved machine is well adapted to the purpose of forming and baking biscuit-cups or cones adapted for serving ice-cream. It may be used for molding and baking various articles, as, for instance, pottery.

The primary object of the invention is to provide a machine of large capacity, which is well adapted to the purpose of molding and baking cups, hollow cones, or the like. In this connection, it may be stated that the annual demand for cones for ice-cream purposes reaches into the millions. Hence, it will be understood that a practical and durable machine capable of producing and automatically handling a large output of goods of this class will operate as a labor-saving machine of great value.

A further object of the invention is to provide for the sanitary production of pastry cups or cones.

A further object is to provide for the production of a pastry cone of less fragile character than those heretofore produced.

Still other objects of the invention will appear from the description hereinafter given.

The accompanying drawings illustrate an advantageous embodiment of the invention. In this form, the invention comprises several pairs (two pairs shown) of vertically reciprocating mold-conduits equipped at their lower ends with mold-engaging devices; a series of nested molds which move progressively through the mold-conduits, being elevated or advanced step-by-step, therethrough as the conduits reciprocate; an oscillatory mold-transferrer at the lower end of each pair of mold-conduits operative to receive the empty molds as they drop successively from the upper portion of the machine, hold the molds, one at a time, while the batter-charging operation is being performed, and deliver alternately to each member of the pair of mold-conduits; an oscillatory mold-transferring device at the upper end of each pair of mold-conduits and operative to receive the upper molds alternately from each member of the pair of conduits, carry the mold through a ninety degree arc and drop it through a return-conduit; shiftable cone-extracting devices mounted upon the upper transferring-device and adapted to hold the baked cone while the mold is dropped; means for shifting the cone-extracting device forwardly after it has been carried through the arc mentioned, and causing the baked cone to be dropped through a discharge-conduit; heating devices encircling portions of the vertically oscillatory mold-conduits; a dough or batter-reservoir in front of the machine proper; an auxiliary oscillatory batter-reservoir disposed above and in front of each lower oscillatory carrier or transferring-device and operative to deliver measured charges to the molds returned to said oscillatory carrier; and means for actuating in timed relation the several movable elements enumerated.

In the embodiment illustrated, the mold-conduits, or tubes, are mounted on lifters or cross-heads which are connected by pitmans with cranks carried by a series of shafts located at the lower portion of the machine, said shafts being geared together, the arrangement being such that the mold-elevators counterbalance each other. Also, in the embodiment shown, the oscillatory carriers are operated by electro-magnetically actuated slides having electro-magnetically operated locking devices; the closures or valves of the auxiliary batter-reservoirs are actuated electro-magnetically; and the cone-withdrawing devices are electro-magnetically shifted. The electric circuits are controlled by a commutator or rotary switch-device mounted on one of the above-mentioned shafts.

In the drawings, Figure 1 represents a side elevational view of the improved molding and baking machine; Fig. 2, a front view taken as indicated at line 2 of Fig. 1, the main batter-reservoir and its stand being removed; Fig. 3, an enlarged vertical sectional view taken as indicated at line 3 of Fig. 2, this view showing the lower portion of the machine; Fig. 4, a complemental sectional view taken as indicated at line 4 of Fig. 2 and showing the upper portion of the machine; Fig. 5, a horizontal sectional view taken as indicated at line 5 of Figs. 1 and 2; Fig. 6, a view taken as indicated at line 6 of Fig. 7, this view showing the means for actuating the lower oscillatory mold-carriers; Fig. 7, a broken vertical sectional view taken as indicated at line 7 of Fig. 5, this view showing the right-hand member of each pair of vertically oscillating mold-tubes in the loading position, that is receiving an additional mold at the lower end of the tube; Fig. 8, a broken section taken as indicated at line 8 of Fig. 7, and showing the actuating means for the lower oscillatory mold-carriers; Fig. 9, a section taken as indicated at line 9 of Fig. 8; Fig. 10, a broken section taken as indicated at line 10 of Fig. 8; Fig. 11, a broken sectional view taken as indicated at line 11 of Fig. 6, this view showing the slide-actuating solenoids and the locking device associated therewith; Fig. 12, a broken view similar to Fig. 11 and showing a different position of the parts; Fig. 13, a view taken as indicated at line 13 of Fig. 11; Fig. 14, a broken plan view of one of the lower oscillatory mold-carriers; Fig. 15, an enlarged broken sectional view taken as indicated at line 15 of Figs. 5, 7, and 14, this view showing the manner in which the mold-tube is mounted on the crosshead, and equipped with mold-engaging devices; Fig. 16, a broken vertical section taken as indicated at line 16 of Fig. 14; Fig. 17, a broken sectional view taken as indicated at line 17 of Fig. 15; Fig. 18, a sectional view taken as indicated at line 18 of Figs. 1 and 2; Fig. 19, a broken sectional view taken as indicated at line 19 of Fig. 18 and showing the circuit-controlling device; Fig. 20, a broken sectional view taken as indicated at line 20 of Fig. 19; Fig. 21, a broken sectional view taken as indicated at line 21 of Fig. 19; Fig. 22, a section taken as indicated at line 22 of Fig. 18; Fig. 23, a section taken as indicated at line 23 of Fig. 21; Fig. 24, a broken vertical sectional view taken as indicated at line 24 of Figs. 2 and 5, this view showing one of the molds in charging position and one of the auxiliary batter-reservoirs in charging position; Fig. 25, a broken perspective view showing the means for oscillating the auxiliary batter-reservoirs; Fig. 26, a broken sectional view taken as indicated at line 26 of Fig. 27, this view showing the valve-controlling device of one of the batter-charging reservoirs; Fig. 27, a section taken as indicated at line 27 of Fig. 26; Figs. 28, 29 and 30, sections taken, respectively, at the corresponding lines, as indicated in Fig. 26; Fig. 31, a section taken as indicated at line 31 of Figs. 2 and 4, this view illustrating the manner in which the mold-tubes are housed and heat-insulated; Fig. 32, a sectional view taken as indicated at line 32 of Figs. 2 and 4; Fig. 33, an enlarged broken sectional view taken as indicated at line 33 of Figs. 4 and 32; this view showing one of the upper oscillatory mold-carriers at the instant of receiving a mold from one of the members of a pair of vertically oscillating mold-tubes; Fig. 34, a broken plan view taken as indicated at line 34 of Fig. 33; Fig. 35, an enlarged broken sectional view taken as indicated at line 35 of Fig. 4, this view showing the solenoid which is shown brokenly at the lower portion of Fig. 34; Fig. 36, a vertically sectional view taken as indicated at line 36 of Fig. 34; Fig. 37, a broken sectional view taken as indicated at line 37 of Fig. 34; Fig. 38, a horizontal sectional view taken as indicated at line 38 of Fig. 33, this view showing a detail of the bearings and housing for one of the mold-tubes; Fig. 39, a perspective view of one of the bearings shown in Fig. 38; Fig. 40, a plan view of one of the upper mold-carriers, showing a mold in section; Fig. 41, a broken vertical sectional view, taken as indicated at line 41 of Fig. 40, this view showing the position of the parts after the cone-withdrawing device has been shifted to the cone-discharging position; Fig. 42, a broken sectional view taken as indicated at line 42 of Fig. 37, this view illustrating, by broken dotted lines, the position of a mold and baked cone with relation to the cone-withdrawing device prior to the expansion of the latter; Fig. 43, a similar view after the cone-withdrawing device has been expanded to grip the cone; Fig. 44, a sectional view taken as indicated at line 44 of Fig. 43; Fig. 45, an enlarged broken vertical section taken as indicated at line 45 of Figs. 3 and 4, this view showing the heating device through which one of the mold-tubes oscillate; Fig. 46, a broken elevational view taken as indicated at line 46 of Fig. 40; and Fig. 47, a diagrammatic view illustrating the electric circuits employed.

In the construction illustrated, A represents the frame of the machine, having its upper portion provided with a housing A'; B, B', B², B³, a series of vertically reciprocable mold-tubes extending into or through the housing A', as will be understood from Fig. 31, the tubes B and B' constituting one pair, and the tubes B² and B³ constituting another pair; B⁴, an annular heating device corresponding with each mold-tube, the heaters being disposed in the lower portion of the housing A', as will be understood from Figs. 3, 4, and 45; B⁵ (Figs. 4 and 38), a guide for each mold-tube, the guides being suspended in the upper portion of the housing A', as shown in Fig. 4; B⁶, B⁶, a series of nested molds contained in each mold-tube and adapted to be progressively advanced therethrough from bottom to top; C, C' (Figs. 1, 2, 5, 7, and 14), a pair of lower oscillatory mold-carriers, or transferring-devices, disposed beneath the mold-tubes, the carrier C co-acting with the pair of mold-tubes B and B'; and the carrier C' co-acting with the pair of mold-tubes B² and B³; D, D', D², D³; a series of tube-actuators, or cross-heads, (Figs. 1, 2, 3, and 5), which carry the several mold-tubes, and are actuated by crank-shafts D⁴, D⁵, D⁶, D⁷, joined by connecting-rods D⁸ to said cross-heads; E, E', oscillatory auxiliary or charging batter-reservoirs, the former operating in connection with the returned molds from the pair of mold-tubes B and B', and the latter co-acting with the returned molds from the pair of mold-tubes B² and B³; E², a stationary main, batter-reservoir serving as a fountain to supply, through flexible tubes E³ the charging reservoirs E, E', E⁴, a charging-chamber oscillating device, or slide, which is adapted to be actuated by the intermediate cross-heads D' and D² (Figs. 5, 24 and 25); F, F' (Figs. 4, 33, 34, 37, 40 and 41); upper oscillatory mold-carriers or transferring-devices, the device F co-acting with the pair of mold-tubes B and B', and the device F' co-acting with the pair of mold-tubes B² and B³; F², a cone-withdrawing device shifter disposed in the front of each upper mold-carrier F'; G, G', mold return conduits located beneath the front portions of the upper mold-carriers; H, H', cone-discharging conduits disposed beneath the pair of cone-withdrawing device shifters F²; J (Figs. 6 to 13, inclusive), electro-magnetic mechanism serving to actuate the lower oscillatory carriers C, C'; K (Figs. 32 and 33), electromagnetically operated devices adapted to actuate the upper oscillatory carriers F and F'; L (Figs. 2 and 18), gear connections between the above-mentioned crank-shafts; M (Figs. 18 to 23, inclusive, and Fig. 47), circuit-controlling devices adapted to control the various actuating electric circuits employed; N (Fig. 47), a source of electric supply for the various actuating circuits; and P (Fig. 47), an alternating current generator adapted to supply current for developing heat, by hysteresis and Foucault, or Eddy current, effects, in the tube-heating devices B⁴.

To facilitate an understanding of a detailed description of the machine, an explanation of the electric circuits will now be given, reference being made to Figs. 6, 11, 13, 24, 32, 35, and 47. The lower carrier-actuating slide of the mechanism J is actuated by solenoids 1 and 2, and is controlled by locking devices operated by solenoids 3 and 4. The actuating slide of the upper carrier-actuating mechanism K is similarly actuated and controlled, and the corresponding parts are indicated by the same reference characters. The circuit arrangement is such, however, that the slides are simultaneously shifted in opposite directions. The shifting devices F² which serve to shift the cone-extractors to the cone discharging position are controlled by solenoids 5; and the valves of the charging batter-reservoirs E and E' are controlled by solenoids 6.

The circuit-controlling device M comprises a rotary member 7 (shown as a development in Fig. 47) and contact points 8, 8, 9, 10, 11 and 12. Corresponding with the cylinder 7 is a constant-contact brush 7ª; and corresponding with the several contact points above enumerated are brushes 8ª, 9ª, etc. Current is supplied, for illustration, by the generator N having a conductor 14 leading to the constant-contact brush 7ª and a conductor 15 serving as a return-conductor for the several partial circuits. The conductor 8ᵇ connects with the brush 8ª and connects through suitable branches with the cone-extractor shifting solenoids 5 and the valve-actuating solenoids 6, the branch conductors also connecting with the return-conductor 15; a conductor 9ᵇ connects with the brush 9ª and through suitable branches with the upper left-hand lock-solenoid 3 and the lower right-hand lock-solenoid 4, the branch conductors being connected with the return-conductor 15; the brush 10ª connects through a conductor 10ᵇ and branch conductors with the upper left-hand slide-actuating solenoid 1 and the lower right-hand slide-actuating solenoid 2, the branch-conductors connecting with the return-conductor 15; the brush 11ª connects through the conductor 11ᵇ and branch-conductors with the upper right-hand solenoid-lock 4 and the lower left-hand solenoid-lock 3; and the brush 12ª connects through a conductor 12ᵇ and suitable branch-conductors with the upper right-hand slide-actuating solenoid 2 and the lower left-hand slide-actuating solenoid 1, the branch-conductors connecting with the return-conductor 15. With the exception of the brush 7ª, the brushes do not contact with the drum 7, but only with the contact-points above enumerated at the proper intervals.

The dotted line 16, shown in the diagrammatic view in Fig. 47, may indicate the appropriate position for the tips of the brushes; and it will be observed that the contact-points above enumerated will pass in the numerical order beneath the brushes, to make contact therewith. It should be observed, however, that inasmuch as the mold-chargers and cone-extractors serve in connection with the molds from both members of a pair of mold-tubes, the circuit 8ᵇ is closed twice at each revolution of the drum 7, and hence the two contact-points 8 are used for this purpose.

As has been indicated, the tube-heaters B⁴ are magnetically heated. They are, therefore, equipped with suitable coils 17 (see Figs. 45 and 47) connected with an electric circuit 18 energized by the alternating-current generator P. By this means Foucault currents are set up in the metal tubular mold-holders, as well as in the metal molds themselves; and the hysteresis effect, due to the rapid alternations of the current, also aid in heating the mold-tube and molds. Furthermore, a certain amount of heat is developed in the coils themselves.

Passing to a detailed description of the machine, the frame A may be of any suitable construction. As shown, it comprises end-standards 19 joined by a longitudinal connecting member 20 which serves to support the bearings for the crank-shafts; a longitudinal connecting-member 20ª which serves to support certain parts; a table or platform 21 mounted on the standards 19; standards or corner-members 22 surmounting the corner portions of the table 21 and disposed outside the housing A', as shown in Figs. 2 and 31; and an upper skeleton platform or frame-member 23 mounted on the standards or upper legs 22, as will be understood from Figs. 2 and 32. The housing A' may be filled with a non-conducting material 24 (shown brokenly in Fig. 31) adapted to prevent radiation of the heat. Inner tubes or shells 25, 26, and 27 afford passages for the tubular mold-holders. Above the upper frame-member 23 the housing A' is continued in the form of a removable section 28, removable sections 29, and removable sections 30, which may be removed at will to give access to the operative parts at the upper portion of the machine. Each tubular mold-holder B, B', B² and B³ comprises preferably a metal tube of magnetic material, mounted on the corresponding cross-head of the D series, as shown in detail in Fig. 15. The tube is open at top and bottom, as will be understood by considering Fig. 15 in connection with Fig. 33. The tube and cross-head may be considered together as a mold-lifter, or elevator, adapted to advance the molds, in nested condition, step-by-step therethrough. Each cross-head is fitted with a pair of spring-projected catches 31 which extends through openings 32 near the lower end of the tube, are mounted in blocks or in guides 33, carried by the cross-head, and are equipped with springs 34. The members 31 have their extremities rounded or beveled on their lower sides, as indicated at 35.

Each mold B has a matrix or cavity 36, shown of conical form; and each mold has its lower portion of conical form, as indicated at 37, and adapted to serve as a male part or core for the succeeding mold below. Each mold also has an upper external flange 38, and a lower point, an external flange 39 separated from the first flange by a circumferential groove 40. The flange 39 is undercut to provide an annular groove 41 which receives the tapered annular upper end 42 of the succeeding mold. When the molds are nested, as shown in Fig. 15, an annular conical space 43 is left as the molding space for the batter-cone 44 (Fig. 37). The upper end of the mold-cavity 36 is a countersink 45; and the annular recess 41 formed within the walls of the flange 39 is provided with a complemental annular recess 45. These complemental recesses are adapted to form an annular bead 44ª at the upper end of the cone 44. Otherwise, the flange 39 of one mold fits closely upon the reduced upper end 42 of the mold below, forming a closed joint thereat. The mold-cavity 36 is tapered, or of greater length than the conical male part 37, thus providing an enlarged space 46 at the bottom of the molding space 43, so that the apex portion of the biscuit-cone will be strengthened. The features just described are of importance in producing a biscuit-cone of sufficient strength to withstand transportation and handling.

The cross-heads of the D series move on pairs of vertical guide-rods 47, 48, 49, and 50, whose lower ends are secured to the longitudinal frame-member 20ª, and whose upper ends are secured to the table or frame-member 21, as shown in Fig. 3. The cross-heads are connected with the upper ends of the links or connecting rods D⁸ by pivots 51, the lower ends of the connecting rods being connected with cranks 52 with which the crank-shafts are equipped.

Each of the lower oscillatory carriers C and C' comprises a skeleton-disk 53 having a depending hub 54 journaled on a stud 55 carried by the frame-member 20ª, as shown in Fig. 7. Each disk 53 is provided with a pair of mold-sockets or cavities 56 and 57 (Figs. 14, 15 and 16). Each mold-socket comprises an upwardly flaring opening 57ª in the disk 53 and a spring-held ring 57ᵇ carried by the disk 53 and disposed above the opening 57ª. The spring-held ring 57ᵇ serves to break the shock when a mold is dropped through the mold-return conduit G', as will be understood from Fig. 16. Also, the springs carrying the ring 57ᵇ may yield additionally to some extent when the reciprocating mold-elevator is lowered to receive an additional mold, as shown in Fig. 15. It may be added that the mold return conduits G and G' are fitted with downwardly converging spring-fingers 58, as shown in Figs. 16, 24 and 31, adapted to break the force of the fall of the mold.

The mechanism J for oscillating the carriers C and C' comprises (Figs. 6 and 7) circumferentially grooved wheels 59 secured on the hubs 54; flexible members or tapes 60 passing about the members 59 (Fig. 8) and secured to the members 59; and a slide 61 mounted in suitable guides 62 with which the frame is equipped (Fig. 10), the tapes 60 being connected with said slide and said slide being actuated by the solenoids 1 and 2. To afford a resilient connection between each tape 60 and the slide 61, each tape is connected with one end of a lever 63 whose free end engages a lug or bearing 64 carried by the frame, and whose intermediate portion engages a coil-spring 65 encircling a screw 66 which passes freely through an opening in the central portion of the member 63.

The slide 61 has its opposite ends equipped with cores 67 for the electro-magnets 1 and 2, as shown in Fig. 11. The cores 67 are provided with reduced extensions 68 adapted to work through perforations 69 in tongues 70 of armatures 71 with which the electro-magnets 3 and 4 are equipped. Thus, the magnets 3 and 4 are adapted to alternately lock the slide 61, as will be understood from Figs. 11 and 12. It is understood, of course, that the reciprocation of the slide 61 serves to oscillate the carriers C and C', first in one direction and then in the other. Thus, when the slide moves to the right, the carriers are rotated clockwise; and when the slide moves to the left the carriers are rotated counter-clockwise. For illustration, Figs. 6, 7, and 14 illustrate the position of the parts after the carriers have been rotated counter-clockwise, in which position the mold-sockets 56 of the carriers occupy an advanced position beneath the return mold conduits G and G', while the sockets 57 of the carriers occupy a position beneath the right-hand members B' and B³ of the two pairs of mold-lifters. When the carriers are rotated in the opposite direction, the sockets 56 are carried beneath the mold-lifters B and B², while the sockets 57 are carried beneath the return-conduits G and G'.

As has been indicated, the batter-charging reservoirs E and E' are kept constantly filled by batter passing from the reservoir E². The reservoir E² is supported on a stand 72 disposed in front of the machine, as shown in Fig. 1. Each of the charging-reservoirs E, E' comprises (Figs. 2, 3, and 24 to 30) a batter-chamber 73 whose lower rear portion is connected, by a pivot 74, to a standard 75 carried by the frame; a counter-weight device comprising a pair of levers 76 supported on pivots 77 and having their front extremities joined by a rod 78 engaging bearings 79 with which the front portions of the chambers 73 are equipped, the rear ends of the levers 76 being equipped with weights 80, as shown in Fig. 1; standards 81 carried by the frame member 20ª and supporting the pivots 77; a plunger-form valve 82 extending through the nozzle 83 of the chamber 73; a cylinder 84 within the chamber 73 and containing a solenoid 6 which co-acts with a core 86 which forms an extension of the rod 82; a valve-closing spring 87 above the core 86 (Figs. 24 and 26), having a reduced extension 88 which is encircled by the spring 87; and a tubular externally-threaded stem 89 having screw-connection with the upper end of the cylinder 84 and serving as an adjusting member for the spring 87 and as a stop for the core 86, said member 89 having a head-portion 90 carrying at one end a pivot 91, upon which is mounted an arm 92 of a switch-member 93 which co-acts with a pair of spring-contacts 94 mounted on the opposite end of the head or block 90. The intermediate portion of the member 93 is incased by an insulation sheath 95 encircled by a metallic sheath 96. The upper end of the reduced extension 88 is adapted to project through a central passage 97 in the member 90, when the solenoid 83 is energized, thereby throwing the switch-member 93 to the position indicated by the dotted lines in Fig. 26, thus breaking the circuit and allowing the spring 87 to move the valve-rod 82 to the closing position shown in Fig. 24. Closure of the switch 93 is effected by means of a cam 98 (Figs. 3 and 24), which is adjustably mounted on the frame. The switch is closed when the chamber 73 is swung to the lowered position shown by dotted lines in Fig. 24. It will be understood, of course, that the circuits of the solenoids 6 are completed through the conductor 8ᵇ only when the brush 8ª of the circuit-controlling mechanism M contacts with one of the contact-points 8 of the rotary member 7.

The operation of swinging the charging chambers E and E' about the pivots 74 is effected by means of the slide E⁴ which, as shown in Figs. 5 and 25, is mounted on the vertical guide-rods 48 and 49 at the front side of the machine. The slide E⁴ is equipped with perforated ears 99 which engage the rods 48 and 49; and an upper portion of the member E⁴ is equipped with a forwardly-projecting arm 100 from which depend links 101 and 102, which, as shown in Fig. 2, are disposed between the chambers E and E', and whose lower ends are connected, by pivots 103, to the lower front portions of the charging chambers. The slide E⁴ is adapted to be carried by either the cross-head D' or the cross-head D², which, as already has been stated, are connected, respectively, with the pair of guide-rods 48 and the pair of guide-rods 49. Thus, the upper end of the slide E⁴ is equipped with a flange 104 adapted to be engaged by the cross-heads just mentioned. When the cross-head D² rises, it elevates the slide E⁴, as shown in Fig. 25, and as the cross-head D² descends and the cross-head D' ascends the slide E⁴ is lowered until it is picked up by the cross-head D', when it is again elevated. Thus the charging chambers will be elevated to the charging position shown in Fig. 24 twice during a complete oscillation of a mold-tube of the B series. In other words, it is necessary that each charging chamber be elevated to the charging position as fast as the molds are taken from the upper ends of a pair of mold-tubes and returned therefrom to the charging position shown in Fig. 24, so that a single charging chamber will take care of the molds from a pair of mold-tubes. Each of the upper oscillatory mold-carriers, F, F' comprises (Figs. 34, 37, and 40 to 43, inclusive) a disk 105 equipped with a depending hub-portion 106 journaled on a stud 107 mounted on the frame-member 23$^a$ which is carried by bars 23$^b$ mounted on the upper frame member (Fig. 32); a wheel 108 secured to the hub 106 and forming a part of the carrier-actuating mechanism K (shown in Fig. 32); two pairs of jaws 109 and 110 mounted on a pivot 111 rising from the stud or spindle 107, said pairs of jaws being disposed adjacent and adapted to swing over perforations 112 and 113, respectively, in the disk 105. Radial guides 114 and 115 disposed, respectively, above the openings 112 and 113 and carried by the disk 105; and extractor-carrying slides 116 and 117 connected with the guides 114 and 115 and equipped with depending cone-extractors 118. When the oscillatory carrier F', for illustration, is in the position shown in Figs. 33, 34, and 40, the jaws 110 are in position to receive a mold B$^6$ from the tube B$^8$. At the same time, the jaws 109 are at the mold-discharging position, the carrier having oscillated to carry a mold received from the mold-tube B$^2$ to a position above the return mold conduit G', where the mold will be discharged or dropped through said conduit G', and the slide 116 will then be ready for actuation by the electro-magnetic device F$^2$ which operates to shift the cone-extractor 118 to a position over the cone-conduit H', as will be understood from Figs. 37 and 41.

The members of the pair of jaws 109 are designated 109$^a$, 109$^b$. Their pivotal portions are equipped with projections 109$^c$ joined together by a spring 109$^d$, which tends to close the jaws. The members of the pair of jaws 110 are designated 110$^a$ and 110$^b$. Their pivotal portions are equipped with arms 110$^c$ connected by a spring 110$^d$ which tends to close the jaws. The tapering or converging upper end-portion 42 of each mold B$^6$ is adapted to force an entrance between the jaws, as will be understood from Figs. 33 and 40, so that the upper flange 38 of the mold will be engaged by the jaws.

The guide 114 comprises suitably grooved side-members adapted to receive the slide 116 between them, the outer portions of said side-members being supported on standards 119 rising from the peripheral portion of the disk 105, and the inner portions of said side-members being supported by a segment 120 carried by a post 121 rising from the disk 105. The guide 115 is similarly supported and its supporting parts correspondingly numbered.

The means for opening the pairs of jaws 109 and 110 to discharge the molds will now be described. Such means comprise posts 122, 123 (Figs. 4, 32, 34, 40 and 46), which, together with additional posts 124, rise from the frame-member 23$^a$ and support segmental guard-strips 125, 126; a cam or abutment 127 carried by the post 122; a cam or abutment 128 carried by the post 123; a stop or projection 109$^e$ carried by the extremity of the jaw 109$^a$ and co-acting with a shoulder 127$^a$ of the cam or projection 127; a lever 129 mounted on a pivot 130 rising from the disk 105; a stud 131 on the end-portion of the jaw 109$^b$ and adapted to engage the inner or rear end of the lever 129, the outer end of the lever 129 co-acting with a shoulder 128$^b$ of the projection or cam 128; a stop or projection 110$^e$ carried by the end-portion of the jaw 110$^b$ and co-acting with a shoulder 128$^a$ of the projection 128; and a lever 132 mounted on a stud 133 rising from the disk 105, the inner end of the lever 132 co-acting with a stud 134 rising from the end-portion of the jaw 110$^a$, and the outer end of the lever 132 co-acting with a shoulder or cam surface 127$^b$ of the cam projection 127 on the post 122.

Fig. 40 shows the position of the parts after the carrier F' has rotated to bring the jaws 109 to a position over the mold return tube G', the stop 109$^e$ having engaged the projection 127 and the outer end of the lever 129 having engaged the cam projection 128, thereby causing the inner end of the lever, through engagement with the stud 131, to open the jaw 109$^b$, thus permitting the mold to drop into the chute G'.

The levers and cams just described are so disposed that when the carrier rotates in the opposite direction the outer end of the lever 132 will pass under the cam projection 128 and finally will engage the cam surface 127$^b$ of the post 122, while the projection 110$^e$ will engage the shoulder 128$^a$ of the cam projection 128, so that the pair of jaws 110 will be opened in the same manner as is illustrated with relation to the jaws 109 in Fig. 40.

The disk 105 is provided at its peripheral portion with radial slots 133$^a$ and 134$^a$ which intersect, respectively, the perforations 112 and 113. These slots are guarded, during rotation of the carrier, by the curved rails or segments 125 and 126, which are separated from each other by a space 135 (Fig. 34), enabling the cone-carrier or cone-extracting device 118 to be shifted to the cone-discharging position shown in Fig. 41.

The construction of the cone-extractor 118 will be understood from Figs. 33, 34, 37, and 41 to 44, inclusive. It comprises a hollow frusto-conical member or shell 136 having an upwardly-flaring wall and which is suspended by a bolt 137 extending freely through an opening in the slide 116; a pair or plurality of toothed members or jaws 138 connected at their lower ends by pivots 139, of a bearing-member 140 connected with the lower end of the bolt 137, said jaws being equipped with outwardly extending points or brads 141 adapted to project through openings 142 in the lateral walls of the shell 136; springs 143 connecting the members 138 and tending to draw them together and sheath the prongs 141, as shown in Fig. 42; and a lock-slide 144 mounted on the upper side of the slide 116 and adapted to lock the bolt 137 in the elevated position. The bolt 137 has its upper end provided with a head 145 which normally is received, as shown in Fig. 42, in a circular opening 146 with which the slide 144 is provided. Extending inwardly from the opening 146 is a reduced opening or slot 147 adapted to receive the shank of the bolt 137 when the slide 144 moves to the locking position shown in Fig. 43. A spring 148 confined between a stud 149 and an end wall 150 of a slot 151 in the slide 144 tends to force the slide 144 to the locking position shown in Fig. 34. A guide-stud 152 also extends through the locking slot 147 and has screw-connection with the slide 116. The slide 116 is equipped with a depending boss 153 whose lower extremity serves as a cam or abutment adapted to engage bevel surfaces 154 with which the cone-impaling members 138 are provided at their upper ends. It will be observed that the bevel surfaces 154 of the two members 138 converge downwardly; and as the two members normally occupy the position shown in Fig. 42, they will be spread apart by the member 153 when the cone-extractor 118 is lifted by the mold B⁶ rising beneath it, as shown in Fig. 33. When this action occurs, the locking slide 144 is shifted by its spring, thereby locking the cone-extractor in elevated position. Encircling the member 153 is a cone-dislodging ring 155 equipped with upwardly-projecting guide-pins 156 which pass freely through perforations in the slide 116. The member 155 rests normally on the upper end of the shell 136, as shown in Fig. 42. When the mold rises and is entered by the cone-extractor 118, as shown in Fig. 33, the member 155 is elevated above the shell 136. After the mold has been dropped, the disk 105 having rotated in the meantime, the cone remains impaled on the prongs 141, as shown in Fig. 43. When the cone-extractor drops, as occurs when the cone-locking slide 144 is forced inwardly in a manner to be presently explained, the prongs 141 are sheathed and the member 155 drops with relation to the shell 136, thereby dislodging the cone. This action occurs after the cone-extractor has been shifted to the cone-discharging position, shown in Fig. 37.

Each cone-extractor shifting device F² (of which there is one contained in each of the housing sections 30) comprises a solenoid 5 heretofore mentioned having a core 157 extending toward the disk 105, the inner extremity 158 of the core 157 being disposed at the opening 135 between the segmental rails 125 and 126. Encircling the core 157 is a spring 159 adapted to yieldingly hold the core at the inner end of its traverse. When the magnet 5 is energized, the core is drawn away from the opening 135, and one of the extractor-carrying slides being at the moment disposed with its outer end adjacent to the inner end of the core, the extractor-carrying slide is moved outwardly, thereby shifting the extractor to the cone-discharging position. The core extends loosely through a ring 160 which carries an inwardly projecting finger 161 adapted to engage a projection 162 carried by the wall 150 of the locking slide 144. Thus, when the device F² shifts the slide 116 from the position shown in Fig. 37 to the position shown in Fig. 41, the finger 161 engages the projection 162, thereby forcing the slide 144 inwardly to the releasing position, so that the cone-extractor can drop, the head 145 of the bolt 137 entering the enlarged opening 146 in the slide 144. After the cone is discharged into the chute H', the electro-magnet 5 is deënergized and the spring 159 returns the core 157 to the normal position shown in Fig. 37.

Attention has been directed to the fact that when a mold is dropped through the return conduit G', it will be received by one of the mold-sockets of the lower oscillatory carrier C' at the batter-charging position, as shown in Fig. 24; and after the mold has received its charge of batter, the carrier will be oscillated to carry the mold to a position beneath the appropriate mold-elevator. The upper end-portion of each mold elevator moves through a bearing B⁵ of the construction shown in Figs. 33, 38 and 39. This comprises a ring 163 suspended by posts 164, from the frame-member 23ª; and a housing or tubular inclosing-member 165 which is also secured at its upper end to the frame-member 23ª. The annular member 163 is equipped at three points with bearing-members 166 which engage vertically-planed surfaces 167 with which the mold-tube B³ is exteriorly provided. This form of bearing or guide permits free vertical oscillation of the mold-tube and also overcomes any tendency of the mold to turn on its axis. The cone-discharging tubes H, H' extend to a convenient point in front of the machine, where the cones may be discharged into any suitable receptacle, nested in boxes, or otherwise disposed of, without the necessity of handling the cones.

The mechanism K, which includes the upper electro-magnets 1 and 2 and locking devices 3 and 4, is similar to the slide-shifting mechanism J and need not be described in detail.

The gear-connections between the crank-shafts of the D⁴ series are such as to cause the crank-shafts to rotate at the same speed. One of the crank-shafts is equipped with a pulley 168, by means of which power is communicated to the machine from any suitable source.

The circuit-controlling mechanism M has already been referred to. Any suitable construction may be employed. The details preferably employed are shown in Figs. 18 to 23, inclusive. The rotary member 7 comprises a sleeve 169 secured to the crank-shaft D⁷; and an insulated sleeve 170 mounted thereon. The continuous contact-brush 7ᵃ contacts always with the sleeve 170. The remaining brushes are elevated somewhat from the surface of the sleeve 170, but in position to be engaged by the several contact-points, so that the several circuits will be closed at the proper intervals. A detail view of the preferred manner of mounting the brushes is shown in Figs. 21 and 23, showing an adjustable brush-holder 171, and the several brushes mounted therein, each brush comprising several leaves. Thus, the brush 9ᵃ, shown in Fig. 23, is composed of three leaves, one of which has a shank 172 for connection with the conductor 9ᵇ.

The operation of the machine may be summarized thus: Power is communicated through the pulley 168, and the crank-shafts are rotated through the mechanism of the gear-train L. The cranks A impart vertical oscillation to the mold-elevators of the B series, the right-hand members of each pair moving upwardly, while the left-hand members of each pair move downwardly, and vice versa. The molds are contained in nested relation in the mold-elevators and are advanced step by step therethrough, the mold-elevators and molds being heated as they pass through the electro-magnetic heaters B⁴ encircling the lower portion of each mold-elevator. The heat is mainly produced by Foucault currents and hysteresis action which occurs in the tubular metal mold-elevators and the metal molds, due to the alternating currents supplied by the generator P to the coils of the heaters B⁴. The lower mold-carriers, or transferring-devices C, C' oscillate through an arc of ninety degrees. Each of said carriers receives a returned mold taken from the upper end of first one member and then the other of the corresponding pair of mold-elevators and dropped through the appropriate return mold conduit to the batter-charging position illustrated in Fig. 24. The upper mold-carriers F and F' oscillate through arcs of ninety degrees, but their motions are contrary to the motions of the lower mold-carriers. Thus, each oscillating carrier receives a mold containing a baked cone from one member of a pair of mold-elevators, while the corresponding lower oscillatory carrier is in position to deliver a freshly charged mold to the other member of the same pair of mold-elevators. After a mold is charged in the position shown in Fig. 24, the charging batter-reservoir is withdrawn from the charging position and the lower carrier is rotated to carry the charged mold below the appropriate descending mold-elevator which is to receive it. When a mold containing a baked mold is elevated to the position illustrated in Fig. 33, the mold is engaged by appropriate jaws of the corresponding upper oscillatory carrier, and at the same time the cone-extractor is expanded to engage the cone, and the cone-extractor is locked in its raised position, after which the carrier oscillates through an arc of ninety degrees, where the jaws are automatically opened and the mold permitted to drop through the return mold conduit. Immediately, thereafter, the extractor-shifting device F² is actuated to draw the extractor forwardly to a position over the cone-discharge chute, whereupon the locking slide 44 is disengaged, releasing the cone-extractor and permitting it to fall a short distance of its traverse, in which movement the impaling points of the members 138 are withdrawn from the cone, and the cone is dislodged from the extractor by the jarring or dislodging device 155. The electric circuits are controlled in the manner described to actuate the oscillatory carriers, the charging batter-reservoir valves, the locking devices for the carrier shifting slides, and the extractor-shifting devices in proper timed relation.

The various actuating devices for the operating parts shown in the drawings are employed as a matter of preference; also the specific construction throughout is employed as a matter of preference. A machine constructed and operating as described is adapted to the sanitary production of this class of goods. Such a machine may be of any desired capacity, inasmuch as the number of units may be increased at will.

It is noted that the measured charge of dough delivered to a mold may be regulated by adjusting the member 89 whose lower end limits the upward movement of the valve 82. It may be remarked that it is our intention to claim the invention for any purpose to which it is applicable.

The material to be molded is referred to as dough or batter, and the product as pastry, biscuit-cup, or the like. Such expressions are to be interpreted as broadly as permissible to cover the invention for the various uses to which it may be put.

It may be added that the feature of producing Foucault currents and the hysteresis effect in the columns of nested molds during the movement of the molds not only simplifies very greatly the manner of supplying heat for baking purposes, but also renders it possible to secure the utmost uniformity in the heating of the mold. This is of very great importance, when the delicate character of the wafer is borne in mind; and inasmuch as the heating effect is produced in and throughout the body of each mold, the importance of this method of heating for this particular art will be readily appreciated.

The foregoing detailed description has been given for clearness of understanding only, and no undue limitation should be understood therefrom, but the appended claims should be construed as broadly as permissible, in view of the prior art.

What we claim as new and desire to secure by Letters Patent is,—

1. In a machine of the character set forth, the combination of a column of molds arranged in nested relation, means for oscillating said column of molds, and means for removing the advance mold from the column and returning it to the other end of the column.

2. In a machine of the character set forth, the combination of a column of molds, means for maintaining said molds in a column and advancing the molds, means for removing the advance mold from the column, an article-extractor associated therewith, and means for returning the empty mold to the opposite end of the column, including a rotary carrier which serves to present the mold to the lower end of the column of molds.

3. In a machine of the character set forth, the combination of a column of molds successively nested in each other, means for oscillating said column of molds, unloading means adapted to receive the uppermost mold from the column, and loading means operative to present a fresh mold to the bottom of the column.

4. In a machine of the character set forth, the combination of a column of nested molds, means for oscillating said column of molds, unloading means operative to receive the uppermost mold when the column is in the elevated position, and loading means operative to present a fresh mold to the bottom of the column when the column is in its lowermost position.

5. In a machine of the character set forth, the combination of an oscillating mold-elevator, a column of successively nested molds therein, mold-engaging means at the lower portion of the elevator adapted to engage a fresh mold when the mold-elevator is lowered, and an unloading device above the mold-elevator equipped with means for engaging the uppermost mold when the mold elevator is in the raised position.

6. In a machine of the character set forth, the combination of a column of molds, means for advancing the molds, a return conduit, an upper carrier adapted to receive the uppermost mold and discharge it through the return conduit, a pastry extractor associated with said upper carrier, a lower carrier adapted to receive the empty mold from the return conduit and present it to the bottom end of the column of molds, and batter-charging means co-acting with said lower carrier.

7. In a machine of the character set forth, the combination of a column of molds, means for advancing the molds, unloading means adapted to receive the uppermost mold, an extractor associated therewith, means for returning the empty mold, loading means operative to receive the returned mold and present the same to the bottom of the mold-column, and batter-charging means associated with said loading means.

8. In a machine of the character set forth, the combination of a column of molds, means for oscillating the same, unloading means, including an oscillatory carrier and an extractor associated therewith, and loading means including an oscillatory carrier and batter-charging means associated therewith.

9. In a machine of the character set forth, the combination of a vertical column of molds, means for oscillating the same, an upper carrier equipped with mold-engaging means and equipped also with a pastry extractor, a return mold conduit, a pastry conduit, and a lower carrier operative to receive the returned mold and present the same to the bottom of the column of molds.

10. In a machine of the character set forth, the combination of a pair of vertically oscillating mold-carriers, columns of molds carried thereby, heating devices associated therewith, an upper carrier movable on a vertical axis and equipped with a plurality of mold-engaging devices and equipped also with a plurality of pastry extractors, a return mold conduit, a lower carrier equipped with a plurality of mold-sockets, and batter-charging means associated with the lower carrier.

11. In a machine of the character set forth, the combination of a column of nested molds, means for reciprocating the same, mold-unloading and returning means, a lower carrier adapted to receive the returned molds, a movably mounted batter-charging device associated with said carrier, and means for actuating the batter-charging device.

12. In a machine of the character set forth, the combination of a column of nested molds, means for advancing the molds, mold-unloading and returning means, including a return conduit, a carrier equipped with a mold-socket adapted to be presented beneath the return conduit, a movably mounted batter-charging device, and means for actuating the batter-charging device.

13. In a machine of the character set forth, the combination of a column of nested molds, means for advancing the molds, mold-unloading and returning means, including a return conduit, a carrier equipped with a mold-socket adapted to be presented beneath the return conduit, a movably mounted batter-charging device equipped with a valve, means for moving said batter-charging device to charging position, and means for actuating said valve.

14. In a machine of the character set forth, the combination of a column of molds, means for advancing the same, mold-unloading and returning means, including a return conduit equipped with means for retarding the fall of the mold, a carrier equipped with mold-receiving means adapted to be presented beneath said conduit, an oscillatory batter-charging reservoir equipped with a valve, and actuating means for said valve.

15. In a machine of the character set forth, the combination of a column of molds, means for advancing the same, mold-unloading and returning means, including a return conduit equipped with means for retarding the fall of the mold, a carrier equipped with mold-receiving means adapted to be presented beneath said conduit, an oscillatory batter-charging reservoir equipped with a valve, and electro-magnetic means controlling the operation of said valve.

16. In a machine of the character set forth, the combination of a plurality of mold-elevators, means for oscillating the mold-elevators, columns of molds carried by the mold-elevators, heating means associated with said columns of molds, and loading and unloading means associated with the mold-columns, including electro-magnetically operated carriers.

17. In a machine of the character set forth, the combination of a plurality of mold-elevators, means for reciprocating the same, columns of nested molds carried by said elevators, unloading means above said columns of molds, including a carrier having a vertical axis, electro-magnetic actuating means for said carrier, loading means, including a carrier having a vertical axis, electro-magnetic means for actuating said last-named carrier, and a batter-charging device associated with said last-named carrier.

18. In a machine of the character set forth, the combination of a plurality of mold-elevators, means for reciprocating the same, columns of nested molds carried by said elevators, unloading means above said columns of molds, including a carrier having a vertical axis, electro-magnetic actuating means for said carrier, loading means, including a carrier having a vertical axis, electro-magnetic means for actuating said last-named carrier, a movably mounted batter-charging reservoir, equipped with a valve, means for moving said reservoir in timed relation with respect to said mold-elevators, and electro-magnetic means controlling the operation of said valve.

19. In a machine of the character set forth, the combination of a plurality of crank-shafts geared together, a plurality of cross-heads connected with said crank-shafts and equipped with mold-engaging catches, tubular conduits rising from and carried by said cross-heads, columns of molds in said conduits, mold unloading and returning means, a carrier-device adapted to receive a returned mold and present it to the bottom of a column of molds, and a batter-charging device associated with said carrier-device.

20. In a machine of the character set forth, the combination of a pair of vertically oscillating mold-elevators having opposite movements of reciprocation, columns of molds carried by said elevators, a carrier disposed above said columns of molds and adapted to receive the molds therefrom in alternation, a mold return conduit adapted to receive the molds from said carrier, loading means including a carrier adapted to receive the molds from said conduit and present the same alternately to the lower ends of said columns of molds, and a batter-charging device associated with said loading means.

21. In a machine of the character set forth, the combination of a column of molds, means for advancing the molds, unloading and returning means, including a return mold conduit, and a carrier equipped with a yieldingly supported mold-holder adapted to be presented beneath said return conduit.

22. In a machine of the character set forth, the combination of a column of nested molds, means for advancing the molds, unloading and returning means, including a return mold conduit, a carrier equipped with a yieldingly supported mold-holder adapted to be presented beneath said conduit, and batter-charging means associated with said carrier.

23. In a machine of the character set forth, the combination of a vertically oscillating mold-elevator equipped with a catch-device, a column of molds supported on said mold-elevator, and a carrier disposed below said elevator and adapted to turn on a vertical axis, said carrier equipped with a mold-socket adapted to be presented below the column of molds.

24. In a machine of the character set forth, the combination of a pair of columns of molds, means for simultaneously reciprocating said columns of molds in opposite directions, and loading and unloading means, including an upper oscillating carrier and a lower oscillating carrier having opposite movements of oscillation.

25. In a machine of the character set forth, the combination of a pair of mold-elevators, means for reciprocating the same in opposite directions, a column of molds carried by each elevator, and upper and lower mold-carriers having opposite movements of oscillation, each mold-carrier being equipped with a pair of mold-holding devices.

26. In a machine of the character set forth, the combination of a pair of mold-elevators, means for reciprocating the same in opposite directions, a column of molds carried by each elevator, upper and lower mold-carriers having opposite movements of oscillation, each mold-carrier equipped with a pair of mold-holding devices, and a mold return conduit co-acting with said pair of carriers.

27. In a machine of the character set forth, the combination of a column of molds, means for reciprocating the same, heating means associated with the column of molds, a return mold conduit, a carrier above the column of molds equipped with mold-engaging means, means for turning said carrier, means for releasing the mold when presented above the return conduit, and a pastry extractor associated with said carrier.

28. In a machine of the character set forth, the combination of a column of molds, means for reciprocating the same, heating means associated with the column of molds, a return mold conduit, a carrier above the column of molds equipped with mold-engaging means, means for turning said carrier, means for releasing the mold when presented above the return conduit, a shiftable pastry extractor mounted on said carrier, and means adjacent the periphery of said carrier for shifting said extractor to the discharging position.

29. In a machine of the character set forth, the combination of a column of molds, means for reciprocating the same, a carrier above the column of molds, means for turning said carrier, releasable mold-engaging means mounted on said carrier, a shiftable pastry extractor mounted on said carrier, a mold-return conduit, a pastry conduit, and means for shifting the extractor to the pastry-discharging position above the pastry conduit after rotation of said carrier.

30. In a machine of the character set forth, the combination of a column of molds, means for advancing the molds, a rotary carrier above the column of molds equipped with mold-engaging jaws and equipped also with a shiftable pastry extractor, means for turning said carrier and effecting release of the mold from said jaws, and means for shifting said extractor and causing it to drop the pastry.

31. In a machine of the character set forth, the combination of a column of molds, means for advancing the molds, a rotary carrier above the column of molds equipped with mold-engaging jaws and equipped also with a shiftable pastry extractor, means for turning said carrier and effecting release of the mold from said jaws, and electro-magnetic means for shifting said pastry extractor.

32. In a machine of the character set forth, the combination of a pair of reciprocating mold-elevators, columns of molds carried thereby, an oscillatory carrier above said columns of molds equipped with a pair of mold-engaging jaws and equipped also with a pair of shiftable pastry extractors, a mold return conduit, a pastry discharge conduit, said carrier adapted to present first one pair of jaws and then the other over the return mold conduit, and means for shifting each mold-extractor when it is presented at a position above said return mold conduit to a position above the pastry discharge conduit.

33. In a machine of the character set forth, the combination of a pair of oscillating mold-elevators, columns of molds carried thereby, a pair of oscillatory mold-carriers, one disposed above the columns of molds and the other below the columns of molds, and electro-magnetic actuating and locking devices associated with said mold-carriers.

34. In a machine of the character set forth, the combination of a pair of oscillating mold-elevators, columns of molds carried thereby, heating means associated with said columns of molds, mold-unloading and returning means, a carrier adapted to receive the returned molds and present them at the lower ends of the mold columns, a movably mounted batter-charging reservoir associated with said carrier, and actuating means for said reservoir adapted to be actuated by said mold-elevators.

35. In a machine of the character set forth, the combination of a pair of oscillating mold-elevators, columns of molds carried thereby, heating means associated with said columns of molds, mold-unloading and returning means, a carrier adapted to receive the returned molds and present them at the lower ends of the mold columns, a movably mounted batter-charging reservoir associated with said carrier, and a slide connected with said reservoir and adapted to be actuated by said mold-elevators.

36. In a machine of the character set forth, the combination of a mold-elevator, a column of molds carried thereby, means for reciprocating the mold-elevator, mold-unloading and returning means, a carrier adapted to receive the returned molds and present them at the lower end of the column of molds, a pivotally mounted batter-charging reservoir associated with said mold-carrier, a counterweight device connected with said reservoir, and means for actuating the reservoir.

37. In a machine of the character set forth, the combination of a column of molds, means for advancing the molds, and unloading means, including a carrier adapted to turn on a vertical axis, said carrier equipped with mold-engaging jaws and equipped also with radial guides, a pastry extractor shiftably mounted in said guides, and means for shifting the pastry extractor.

38. In a machine of the character set forth, the combination of a column of molds, means for advancing the molds, and unloading means, including a carrier adapted to turn on a vertical axis, said carrier equipped with mold-engaging jaws and equipped also with radial guides, a pastry extractor shiftably mounted in said guides, and an electromagnetic device adjacent the periphery of said carrier and adapted to shift said extractor to the pastry-discharging position.

39. In a machine of the character set forth, the combination of a column of molds, means for advancing the molds, and unloading means, including a carrier equipped with mold-engaging jaws, means for moving the carrier, means for releasing the jaws to permit the mold to fall, a shiftably mounted extractor above said jaws, said extractor equipped with sheathable pastry-engaging means, means for locking the extractor in expanded condition, and means for shifting the extractor and effecting the sheathing of the pastry-engaging means.

40. In a machine of the character set forth, the combination of a column of nested molds, means for advancing the molds, and unloading means, including a carrier equipped with mold-engaging jaws, a slide mounted on the carrier above said jaws and equipped with a depending pastry extractor having sheathable pastry-engaging means, and means for shifting said slide.

41. In a machine of the character set forth, the combination of a column of nested molds, means for advancing the molds, and unloading means, including a carrier equipped with mold-engaging jaws, a slide mounted on said carrier above said jaws, a core depending from said slide and equipped internally with pronged pastry-engaging members, said core being vertically movable, means for moving said members to the pastry-impaling position, and means for shifting said slide.

42. In a machine of the character set forth, the combination of a column of nested molds, means for advancing the molds, and unloading means, including a carrier equipped with mold-engaging jaws, a slide mounted on said carrier above said jaws, a core depending from said slide and equipped internally with pronged expansible pastry-engaging members, said core being vertically movable, means for moving said members to the pastry-impaling position, means for locking said members in expanded position, and means for shifting said slide and releasing said pronged members.

43. In a machine of the character set forth, the combination of a column of nested molds, means for advancing the molds, and unloading means, including a carrier equipped with mold-engaging means and equipped also with a movably mounted pastry-extractor, said extractor including a vertically movable shell, prong-equipped jaws therein, and means for expanding the jaws when said shell is moved vertically.

44. In a machine of the character set forth, the combination of a column of nested molds, means for advancing the molds, and unloading means, including a carrier equipped with mold-engaging means and equipped also with a movably mounted pastry extractor, said extractor including a vertically movable shell, prong-equipped jaws therein, means for expanding the jaws when said shell is moved vertically, and a pastry-dislodging device associated with said extractor.

45. In a machine of the character set forth, the combination of a column of molds, means for advancing the molds, and unloading means, including a carrier equipped with a mold-engaging device and an extractor movably mounted on said carrier and comprising a slide equipped with a depending projection, a vertically movable stem depending from said slide and equipped with a shell, jaws in said shell equipped with prongs adapted to project through the shell, said jaws adapted to engage the projection on said slide when the shell is elevated, and a locking slide mounted on said first-named slide and co-acting with said stem.

46. In a machine of the character set forth, the combination of a series of shafts geared together, a series of mold-elevators each comprising a cross-head connected with a shaft and a tubular mold-conduit rising from said cross-head, a column of molds in each mold-conduit, heating means associated with the mold-conduits, and mold-unloading and returning means.

47. In a machine of the character set forth, the combination of a series of shafts geared together, a series of mold-elevators each comprising a cross-head connected with a shaft and a tubular mold-conduit rising from said cross-head, a column of molds in each mold-conduit, heating means associated with the mold-conduits, mold-unloading and returning means, and mold-loading means.

48. In a machine of the character set forth, the combination of a series of shafts geared together, a series of mold-elevators each comprising a cross-head connected with a shaft and a tubular mold-conduit rising from said cross-head, a column of molds in each mold-conduit, heating means associated with the mold-conduits, mold-unloading and returning means, mold-loading means, and batter-charging means associated with the mold-loading means.

49. In a machine of the character set forth, the combination of an oscillatory mold-elevator, a column of molds carried thereby, and electro-magnetic heating means encircling the column of molds and adapted to produce Foucault currents in the molds.

50. In a machine of the character set forth, the combination of an oscillating mold-carrier equipped with a tubular metal conduit, a column of nested molds in said conduit, a coil encircling said conduit, and means for producing interrupted electric currents in said coil.

51. In a machine of the character set forth, the combination of a column of molds successively nested in each other, means for oscillating said column of molds, a heating conduit through which the column of molds extends, unloading means adapted to remove the uppermost mold from the column, means outside of said conduit for returning the molds successively to the bottom of the column, and loading means operative to successively present the returned mold to the bottom of the column.

52. In a machine of the character set forth, the combination of a vertically oscillating mold-elevator, a column of molds carried thereby, a heating device including a coil adjacent the mold-column, means for producing alternating currents in said coil, and heat-insulating material encircling said coil.

53. In a machine of the character set forth, the combination of a plurality of oscillating mold-elevators, columns of molds carried thereby, oscillating carriers associated with said mold-elevators, batter-charging reservoirs equipped with valves, electro-magnetic devices for actuating said carriers and valves, and controlling circuits for said electro-magnetic devices.

54. In a machine of the character set forth, the combination of a series of molds, each mold provided with a matrix and having its lower portion tapering and affording a male part, said molds fitting together in nested relation, each mold being externally provided with an annular shoulder which bears on the upper end of the mold beneath it, and each mold being also provided above such shoulder with an external annular flange.

55. In a machine of the character set forth, the combination of a plurality of columns of nested molds in tandem relation, heating means associated with said columns of molds, actuating mechanism connecting said columns of molds, whereby the mold-columns will mutually counterbalance each other, means for oscillating the mold-columns, means for successively removing the uppermost molds from the columns and returning them to the bottoms of the columns, and means for charging each mold with batter before it is presented at the foot of the appropriate mold-column.

HAROLD VEATCH BOZELL.
HERBERT BANCROFT DWIGHT.

In presence of—
JOSIAH L. LINDSEY,
ENETT R. NEWBY.